(12) United States Patent
Hanson et al.

(10) Patent No.: US 12,329,157 B2
(45) Date of Patent: **\*Jun. 17, 2025**

(54) ANIONIC SURFACTANT IMPACT ON VIRUCIDAL EFFICACY

(71) Applicant: ECOLAB USA INC., Saint Paul, MN (US)

(72) Inventors: Catherine Hanson, Saint Paul, MN (US); Junzhong Li, Saint Paul, MN (US); Jonathan Scott Killeen, Baden Württemberg (DE); Lisa A. Hellickson, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 236 days.

This patent is subject to a terminal disclaimer.

(21) Appl. No.: 17/247,554

(22) Filed: Dec. 16, 2020

(65) Prior Publication Data

US 2021/0176986 A1   Jun. 17, 2021

Related U.S. Application Data

(60) Provisional application No. 62/948,378, filed on Dec. 16, 2019.

(51) Int. Cl.
*A01N 37/02* (2006.01)
*A01N 25/30* (2006.01)
*A01N 41/04* (2006.01)

(52) U.S. Cl.
CPC ............. *A01N 37/02* (2013.01); *A01N 25/30* (2013.01); *A01N 41/04* (2013.01)

(58) Field of Classification Search
CPC ........ A01N 37/02; A01N 25/30; A01N 41/04; Y02A 50/30
See application file for complete search history.

(56) References Cited

U.S. PATENT DOCUMENTS

| | | |
|---|---|---|
| 4,002,775 A | 1/1977 | Kabara |
| 4,320,147 A | 3/1982 | Schaeufele |
| 4,749,508 A | 6/1988 | Cockrell, Jr. et al. |
| 4,828,912 A | 5/1989 | Hossain et al. |
| 4,897,304 A | 1/1990 | Hossain et al. |
| 4,975,217 A | 12/1990 | Brown-Skrobot et al. |
| 4,987,304 A | 1/1991 | Kulpinski et al. |
| 5,143,720 A | 9/1992 | Lopes |
| 5,192,460 A | 3/1993 | Thomas et al. |
| 5,231,087 A | 7/1993 | Thornfeldt |
| 5,234,719 A | 8/1993 | Richter et al. |
| 5,330,769 A | 7/1994 | McKinzie et al. |
| 5,336,426 A | 8/1994 | Rader et al. |
| 5,364,551 A | 11/1994 | Lentsch et al. |
| 5,389,685 A | 2/1995 | Smith et al. |
| 5,419,908 A | 5/1995 | Richter et al. |
| 5,436,008 A | 7/1995 | Richter et al. |
| 5,512,200 A | 4/1996 | Garcia |
| 5,543,008 A | 8/1996 | Hidber et al. |
| 5,545,749 A | 8/1996 | Smith et al. |
| 5,547,990 A | 8/1996 | Hall et al. |
| 5,797,986 A | 8/1998 | Rolando et al. |
| 5,833,741 A | 11/1998 | Walker |
| 5,851,980 A | 12/1998 | Avery |
| 5,962,392 A | 10/1999 | Revell et al. |
| 5,965,514 A | 10/1999 | Wierenga et al. |
| 6,080,712 A | 6/2000 | Revell et al. |
| 6,083,890 A | 7/2000 | Miskiel et al. |
| 6,106,774 A | 8/2000 | Monticello et al. |
| 6,121,224 A | 9/2000 | Fonsny et al. |
| 6,150,557 A | 11/2000 | Adams et al. |
| 6,197,738 B1 | 3/2001 | Regutti |
| 6,197,814 B1 | 3/2001 | Arata |
| 6,200,941 B1 | 3/2001 | Strandburg et al. |
| 6,221,823 B1 | 4/2001 | Crisanti et al. |
| 6,239,092 B1 | 5/2001 | Papasso et al. |
| 6,346,279 B1 | 2/2002 | Rochon |
| 6,432,906 B1 | 8/2002 | Carlson et al. |
| 6,451,748 B1 | 9/2002 | Taylor et al. |
| 6,464,764 B1 | 10/2002 | Lichtenberg et al. |
| 6,472,358 B1 | 10/2002 | Richter et al. |
| 6,495,506 B1 | 12/2002 | Massaux et al. |
| 6,498,137 B1 | 12/2002 | Schalitz et al. |
| 6,514,918 B1 | 2/2003 | Librizzi |
| 6,559,111 B2 | 5/2003 | Colurciello, Jr. et al. |

(Continued)

FOREIGN PATENT DOCUMENTS

| | | |
|---|---|---|
| CA | 2320541 A1 | 3/2001 |
| CA | 2167485 C | 5/2004 |
| CA | 2562329 C | 12/2009 |
| CN | 1404359 A | 3/2003 |

(Continued)

OTHER PUBLICATIONS

Gaonkar et al., "In vivo efficacy of an alcohol-based surgical hand disinfectant containing a synergistic combination of ethylhexylglycerin and preservatives", Journal of Hospital Infection, vol. 63, pp. 412-417, 2006.

"Caliciviridae Family Tree", https://www.caliciviridae.com/caliciviridae_family_tree.htm, retrieved from internet on Mar. 4, 2022 ((U.S. Appl. No. 16/143,146) in Office Action dated Mar. 14, 2022 for same), Apr. 7, 2015.

(Continued)

*Primary Examiner* — Snigdha Maewall

(74) *Attorney, Agent, or Firm* — McKee, Voorhees & Sease, PLC

(57) ABSTRACT

Virucidal compositions including at least one acid and an alpha olefin sulfonate anionic surfactant are provided. In particular, virucidal efficacy against Murine Norovirus is provided at improved efficacy rates beyond comparative anionic surfactants. Methods of using a virucidal composition are also provided.

18 Claims, 4 Drawing Sheets

(56) References Cited

U.S. PATENT DOCUMENTS

| | | |
|---|---|---|
| 6,583,103 B1 | 6/2003 | Klinkhammer |
| 6,583,176 B2 | 6/2003 | Arata |
| 6,583,181 B1 | 6/2003 | Chiang et al. |
| 6,699,825 B2 | 3/2004 | Rees et al. |
| 6,701,940 B2 | 3/2004 | Tsibouklis et al. |
| 6,740,626 B2 | 5/2004 | Neumiller |
| 6,794,346 B2 | 9/2004 | Wick et al. |
| 6,936,579 B2 | 8/2005 | Urban |
| 6,939,840 B2 | 9/2005 | Lichtenberg et al. |
| 6,982,245 B1 | 1/2006 | Faubel et al. |
| 6,987,192 B2 | 1/2006 | Manzer |
| 7,053,039 B2 | 5/2006 | Burt et al. |
| 7,166,563 B2 | 1/2007 | Woodhead |
| 7,196,046 B2 | 3/2007 | Cheung et al. |
| 7,304,022 B2 | 12/2007 | Cheung et al. |
| 7,419,944 B2 | 9/2008 | Mowrey-Mckee et al. |
| 7,470,656 B2 | 12/2008 | Sherry et al. |
| 7,488,708 B2 | 2/2009 | Deljosevic et al. |
| 7,493,565 B2 | 2/2009 | Parupudi et al. |
| 7,569,232 B2 | 8/2009 | Man et al. |
| 7,569,530 B1 | 8/2009 | Pan et al. |
| 7,629,043 B2 | 12/2009 | Lindsay et al. |
| 7,943,565 B2 | 5/2011 | Kany et al. |
| 7,998,495 B2 | 8/2011 | Argo et al. |
| 7,998,919 B2 | 8/2011 | Rong et al. |
| 8,093,195 B2 | 1/2012 | Uhl et al. |
| 8,143,309 B2 | 3/2012 | Awad |
| 8,187,652 B2 | 5/2012 | Man et al. |
| 8,198,227 B2 | 6/2012 | Cermenati et al. |
| 8,221,733 B2 | 7/2012 | Lichtenberg et al. |
| 8,268,334 B2 | 9/2012 | Dreilinger et al. |
| 8,282,743 B2 | 10/2012 | Bonnechere et al. |
| 8,377,870 B2 | 2/2013 | Takeuchi et al. |
| 8,410,038 B2 | 4/2013 | Davister et al. |
| 8,420,587 B2 | 4/2013 | Cermenati et al. |
| 8,563,496 B2 | 10/2013 | Cermenati et al. |
| 8,569,373 B2 | 10/2013 | Foret et al. |
| 8,618,041 B2 | 12/2013 | Toussaint et al. |
| 8,722,609 B2 * | 5/2014 | Choczaj ............... C11D 3/2079 510/253 |
| 8,729,005 B2 | 5/2014 | McKechnie et al. |
| 8,853,269 B2 | 10/2014 | Mosbaugh et al. |
| 8,871,807 B2 | 10/2014 | Gohl et al. |
| 8,962,283 B2 | 2/2015 | Cascao-Pereira et al. |
| 9,096,821 B1 | 8/2015 | Hope et al. |
| 9,115,136 B2 | 8/2015 | Mackawa et al. |
| 9,167,812 B2 | 10/2015 | Bigorra Llosas et al. |
| 9,419,944 B2 | 8/2016 | Chan et al. |
| 9,795,132 B2 | 10/2017 | Kiesel et al. |
| 10,028,924 B2 | 7/2018 | Leibowitz et al. |
| 10,045,529 B2 | 8/2018 | Griese et al. |
| 10,076,115 B2 | 9/2018 | Salminen et al. |
| 10,085,447 B2 | 10/2018 | Griese et al. |
| 10,111,426 B2 | 10/2018 | Auberger |
| 10,206,392 B2 | 2/2019 | Kloeppel et al. |
| 10,285,400 B2 | 5/2019 | Lei et al. |
| 10,426,162 B2 | 10/2019 | Man et al. |
| 10,487,297 B2 | 11/2019 | Moore |
| 10,952,430 B2 | 3/2021 | Alderson |
| 11,026,422 B2 | 6/2021 | Hanson et al. |
| 11,129,385 B2 | 9/2021 | Alderson |
| 11,191,264 B2 | 12/2021 | Anderson et al. |
| 11,268,049 B2 | 3/2022 | Li et al. |
| 11,278,480 B2 | 3/2022 | Barne et al. |
| 2001/0046979 A1 | 11/2001 | Roselle et al. |
| 2002/0058010 A1 | 5/2002 | Picard-Lesboueyries et al. |
| 2002/0061366 A1 | 5/2002 | Walker et al. |
| 2002/0098159 A1 | 7/2002 | Wei et al. |
| 2003/0029812 A1 | 2/2003 | Burns et al. |
| 2003/0114342 A1 | 6/2003 | Hall |
| 2003/0165455 A1 | 9/2003 | Guillou et al. |
| 2003/0187073 A1 | 10/2003 | Lichtenberg et al. |
| 2004/0176266 A1 | 9/2004 | Kwetkat et al. |
| 2004/0220275 A1 | 11/2004 | Lutzeler et al. |
| 2004/0242444 A1 | 12/2004 | Behler et al. |
| 2005/0042183 A1 | 2/2005 | Kato et al. |
| 2005/0065055 A1 | 3/2005 | Barnes |
| 2005/0101511 A1 | 5/2005 | Zocchi |
| 2005/0107267 A1 | 5/2005 | Lopes |
| 2005/0121054 A1 | 6/2005 | Barnabas et al. |
| 2005/0124723 A1 | 6/2005 | Fritschi et al. |
| 2005/0192199 A1 | 9/2005 | Cartwright et al. |
| 2005/0239676 A1 | 10/2005 | Gaudreault |
| 2005/0271711 A1 | 12/2005 | Lynch et al. |
| 2005/0288204 A1 | 12/2005 | Matts et al. |
| 2006/0029558 A1 | 2/2006 | Schlievert et al. |
| 2006/0030512 A1 | 2/2006 | Hart |
| 2006/0035808 A1 | 2/2006 | Ahmed et al. |
| 2006/0079543 A1 | 4/2006 | Sum et al. |
| 2006/0100128 A1 | 5/2006 | McCue et al. |
| 2006/0160712 A1 | 7/2006 | Hei et al. |
| 2006/0194709 A1 | 8/2006 | Boone et al. |
| 2006/0293202 A1 | 12/2006 | Cate et al. |
| 2006/0293214 A1 | 12/2006 | Cheng et al. |
| 2007/0010420 A1 | 1/2007 | Lange et al. |
| 2007/0027119 A1 | 2/2007 | Ahmed et al. |
| 2007/0185350 A1 | 8/2007 | Arata |
| 2008/0015134 A1 | 1/2008 | Ahmed et al. |
| 2008/0139443 A1 | 6/2008 | Buzinski et al. |
| 2008/0255023 A1 | 10/2008 | Shimmin et al. |
| 2008/0312327 A1 | 12/2008 | Rypkema et al. |
| 2008/0313795 A1 | 12/2008 | Lu |
| 2009/0035339 A1 | 2/2009 | Istvan et al. |
| 2009/0062175 A1 | 3/2009 | Cermenati et al. |
| 2009/0062391 A1 † | 3/2009 | New |
| 2009/0197786 A1 | 8/2009 | Perry et al. |
| 2009/0208444 A1 | 8/2009 | King et al. |
| 2009/0312225 A1 | 12/2009 | Szewczyk et al. |
| 2009/0312226 A1 | 12/2009 | Szewczyk et al. |
| 2009/0312227 A1 | 12/2009 | Murphy et al. |
| 2010/0068295 A1 | 3/2010 | Bobbert |
| 2010/0093596 A1 | 4/2010 | Tadrowski |
| 2010/0154823 A1 | 6/2010 | Cermenati et al. |
| 2010/0178512 A1 | 7/2010 | Giesenberg et al. |
| 2010/0234322 A1 | 9/2010 | Asari |
| 2010/0234328 A1 | 9/2010 | Ahmed et al. |
| 2010/0286014 A1 | 11/2010 | Barnes |
| 2011/0013764 A1 | 1/2011 | Wiener et al. |
| 2011/0097422 A1 | 4/2011 | Lopes |
| 2011/0118162 A1 | 5/2011 | Shiloach et al. |
| 2011/0178176 A1 | 7/2011 | New |
| 2011/0230385 A1 | 9/2011 | Murphy et al. |
| 2011/0262557 A1 | 10/2011 | Omidbakhsh |
| 2011/0281779 A1 | 11/2011 | Weerasooriya et al. |
| 2012/0121679 A1 | 5/2012 | Cannon et al. |
| 2012/0122756 A1 | 5/2012 | Gaudreault |
| 2012/0136051 A1 | 5/2012 | Li et al. |
| 2012/0142577 A1 | 6/2012 | Sun et al. |
| 2012/0225943 A1 | 9/2012 | Gohl et al. |
| 2012/0302642 A1 | 11/2012 | Post |
| 2013/0108555 A1 | 5/2013 | Lary et al. |
| 2013/0109611 A1 | 5/2013 | O'Connor et al. |
| 2013/0196890 A1 | 8/2013 | Post |
| 2013/0309336 A1 | 11/2013 | Auberger |
| 2013/0316939 A1 | 11/2013 | Moragas Arjant et al. |
| 2013/0331308 A1 | 12/2013 | Rees et al. |
| 2014/0024572 A1 | 1/2014 | Gaudreault |
| 2014/0041686 A1 | 2/2014 | Ryther et al. |
| 2014/0066356 A1 | 3/2014 | Gaudreault |
| 2014/0171512 A1 | 6/2014 | Kloeppel et al. |
| 2014/0230841 A1 | 8/2014 | Mathonneau |
| 2014/0274973 A1 | 9/2014 | Pedersen et al. |
| 2014/0275255 A1 | 9/2014 | Pedersen et al. |
| 2014/0275267 A1 | 9/2014 | Beug-Deeb et al. |
| 2014/0336094 A1 | 11/2014 | Gross |
| 2015/0057375 A1 | 2/2015 | Vandeputte et al. |
| 2015/0093425 A1 | 4/2015 | Moore |
| 2015/0225674 A1 | 8/2015 | Masters et al. |
| 2015/0305343 A1 | 10/2015 | Burke et al. |
| 2015/0335598 A1 | 11/2015 | Buchalova et al. |
| 2015/0373989 A1 | 12/2015 | Krasnow et al. |
| 2016/0058005 A1 | 3/2016 | Hazenkamp et al. |
| 2016/0100577 A1 | 4/2016 | Salminen et al. |
| 2016/0101027 A1 | 4/2016 | Schelges et al. |

(56) References Cited

U.S. PATENT DOCUMENTS

| | | |
|---|---|---|
| 2016/0150779 A1 | 6/2016 | Li et al. |
| 2016/0263062 A1 | 9/2016 | Liebowitz et al. |
| 2017/0015947 A1 | 1/2017 | Cermenati et al. |
| 2017/0173642 A1 | 6/2017 | Li et al. |
| 2017/0284605 A1 | 10/2017 | Janak et al. |
| 2017/0292092 A1 | 10/2017 | Asmanidou et al. |
| 2017/0333586 A1 | 11/2017 | Kang et al. |
| 2018/0027812 A1 | 2/2018 | Bobbert |
| 2018/0055048 A1 | 3/2018 | Premachandran et al. |
| 2018/0187129 A1 | 7/2018 | Traistaru et al. |
| 2018/0208875 A1 | 7/2018 | Man et al. |
| 2018/0265808 A1 | 9/2018 | Gross |
| 2018/0303090 A1 | 10/2018 | Budhian et al. |
| 2019/0090480 A1 | 3/2019 | Lo et al. |
| 2019/0090483 A1 | 3/2019 | Hanson et al. |
| 2019/0275468 A1 | 9/2019 | Schacht et al. |
| 2019/0330568 A1 | 10/2019 | Ceulemans et al. |
| 2020/0140784 A1 | 5/2020 | Delaney et al. |
| 2020/0229435 A1 | 7/2020 | Malet et al. |
| 2020/0245615 A1 | 8/2020 | Ahmadpour |
| 2020/0305437 A1 | 10/2020 | McGeechan et al. |
| 2020/0345005 A1 | 11/2020 | Tinwala et al. |
| 2020/0345606 A1 | 11/2020 | Zhang et al. |
| 2021/0002586 A1 | 1/2021 | Anderson et al. |
| 2021/0113443 A1 | 4/2021 | Borish et al. |
| 2021/0121378 A1 | 4/2021 | Chang et al. |
| 2021/0121382 A1 | 4/2021 | Chang et al. |
| 2021/0176986 A1 | 6/2021 | Hanson et al. |
| 2021/0307327 A1 | 10/2021 | Alderson |
| 2021/0315207 A1 | 10/2021 | Alderson |
| 2021/0386066 A1 | 12/2021 | Alderson |
| 2021/0393497 A1 | 12/2021 | Alderson |
| 2022/0056370 A1 | 2/2022 | Falk et al. |
| 2022/0071873 A1 | 3/2022 | Aubert et al. |
| 2022/0195350 A1 | 6/2022 | Huang et al. |
| 2022/0232828 A1 | 7/2022 | Patel et al. |
| 2022/0330552 A1 | 10/2022 | Banas et al. |
| 2022/0364022 A1 | 11/2022 | Batchelor et al. |
| 2022/0372400 A1 | 11/2022 | Batchelor et al. |
| 2022/0380658 A1 | 12/2022 | Campbell et al. |
| 2023/0303949 A1 | 9/2023 | Batchelor et al. |
| 2024/0130370 A1 | 4/2024 | Li et al. |
| 2024/0164375 A1 | 5/2024 | Caillet et al. |

FOREIGN PATENT DOCUMENTS

| | | |
|---|---|---|
| CN | 101233852 A | 8/2008 |
| CN | 102905562 A | 1/2013 |
| CN | 104004598 A | 8/2014 |
| CN | 104353100 A | 2/2015 |
| CN | 105745316 B | 9/2018 |
| DE | 19804829 A1 | 8/1999 |
| DE | 202013103933 U1 | 10/2013 |
| EP | 1095663 A1 | 5/2001 |
| EP | 0879276 B1 | 11/2001 |
| EP | 1420753 A2 | 5/2004 |
| EP | 1447100 A1 | 8/2004 |
| EP | 1479754 A1 | 11/2004 |
| EP | 1036146 B1 | 1/2005 |
| EP | 1430884 B1 | 11/2005 |
| EP | 1739161 B1 | 4/2009 |
| EP | 1707240 B1 | 4/2010 |
| EP | 2843034 A1 | 3/2015 |
| EP | 2965624 A1 | 1/2016 |
| EP | 2304010 B1 | 10/2017 |
| GB | 2428973 A | 2/2007 |
| ID | 201904665 A | 7/2019 |
| IN | 2736CHE2015 | 3/2016 |
| IN | 211DEL2015 | 7/2016 |
| JP | 58135802 A | 8/1983 |
| JP | H02308897 A | 12/1990 |
| JP | H04139202 A | 5/1992 |
| JP | H04332800 A | 11/1992 |
| JP | 967599 A | 3/1997 |
| JP | 2000273494 A | 10/2000 |
| JP | 2002173698 A | 6/2002 |
| JP | 2003096498 A | 4/2003 |
| JP | 2003105386 A | 4/2003 |
| JP | 2004059806 A | 2/2004 |
| JP | 2008510033 A | 4/2008 |
| JP | 2008266375 A | 11/2008 |
| JP | 2010084087 A | 4/2010 |
| JP | 2012072265 A | 4/2012 |
| JP | 6165953 B1 | 7/2017 |
| JP | 2020075888 A | 5/2020 |
| JP | 2020075889 A | 5/2020 |
| KR | 20060046896 A | 5/2006 |
| KR | 101754451 B1 | 7/2017 |
| KR | 20190106166 A | 9/2019 |
| TW | 201317338 A | 5/2013 |
| WO | 9221238 A1 | 12/1992 |
| WO | 9320176 A1 | 10/1993 |
| WO | 9410837 A1 | 5/1994 |
| WO | 9419443 A1 | 9/1994 |
| WO | 9426857 A1 | 11/1994 |
| WO | 9504459 A1 | 2/1995 |
| WO | 9514070 A1 | 5/1995 |
| WO | 9609761 A1 | 4/1996 |
| WO | 9623605 A1 | 8/1996 |
| WO | 9715649 A1 | 5/1997 |
| WO | 9725403 A1 | 7/1997 |
| WO | 9801525 A2 | 1/1998 |
| WO | 9855093 A1 | 12/1998 |
| WO | 9916854 A1 | 4/1999 |
| WO | 0035283 A1 | 6/2000 |
| WO | 0059696 A2 | 10/2000 |
| WO | 0063337 A1 | 10/2000 |
| WO | 0121753 A1 | 3/2001 |
| WO | 0153444 A1 | 7/2001 |
| WO | 0164035 A2 | 9/2001 |
| WO | 0210325 A1 | 2/2002 |
| WO | 03020229 A2 | 3/2003 |
| WO | 2005103218 A1 | 11/2005 |
| WO | 2006117516 A2 | 11/2006 |
| WO | 200702696DEL P1 | 4/2007 |
| WO | 2008031104 A3 | 3/2008 |
| WO | 2008045860 † | 4/2008 |
| WO | 2008045860 A2 | 4/2008 |
| WO | 2008049616 A1 | 5/2008 |
| WO | 2008068154 A2 | 6/2008 |
| WO | 2009134706 A1 | 11/2009 |
| WO | 2011087494 A2 | 7/2011 |
| WO | 2013107822 A1 | 7/2013 |
| WO | 2014098759 † | 6/2014 |
| WO | 2014098759 A1 | 6/2014 |
| WO | 2014137605 A1 | 9/2014 |
| WO | 2014164021 A1 | 10/2014 |
| WO | 2015036433 A1 | 3/2015 |
| WO | 2015060775 A1 | 4/2015 |
| WO | 2015098265 A1 | 7/2015 |
| WO | 2015120990 A1 | 8/2015 |
| WO | 2016124764 A1 | 8/2016 |
| WO | 2019067560 A1 | 4/2019 |
| WO | 2019103887 A1 | 5/2019 |
| WO | 2020114679 A1 | 6/2020 |
| WO | 2020210784 A1 | 10/2020 |
| WO | 2020210789 † | 10/2020 |
| WO | 2020210789 A1 | 10/2020 |
| WO | 2021023633 A1 | 2/2021 |
| WO | 2021180546 A1 | 9/2021 |
| WO | 2022104031 A2 | 5/2022 |
| WO | 2022117855 A1 | 6/2022 |
| WO | 2022162239 A1 | 8/2022 |
| WO | 2022185251 A1 | 9/2022 |
| WO | 2023219865 A1 | 11/2023 |

OTHER PUBLICATIONS

Moorman, Eric Alan, "Alternative Chemical Disinfection Technologies for Inactivation of Human Norovirus on Surfaces", Thesis for Graduation from North Carolina State University. 91 pages 2017.
Cannon et al., "Surrogates for the Study of Norovirus Stability and Inactivation in the Environment: A Comparison of Murine Noro-

(56) References Cited

OTHER PUBLICATIONS virus and Feline Calicivirus", Journal of Food Protection, vol. 69, No. 11, pp. 2761-2765, 2006.
Jaykus et al., "Norovirus Surrogates and the Challenges of Staying Effective in Killing Norovirus", https://www.statefoodsafety.com/Resources/Resources/norovirus-surrogates-and-the-challenges-of-staying-effective-in-killing-norovirus, 2 pages, accessed Nov. 11, 2019.
EPA, "Guidance to Registrants: Process for Making Claims Against Emerging Viral Pathogens not on EPA-Registered Disinfectant Labels", US Environmental Protection Agency, pp. 1-8, Aug. 19, 2016.
Boomsma et al., "L-Lactic Acid—A Safe Antimicrobial for Home- and Personal Care Formulations", Home Care Surfactants, pp. 141-144, Oct. 2015.
"PROSAN-L Food Contact Surface Sanitizer", Safety Data Sheet, http://store.cleaningpro.com/safety/SProsanL, 9 pages Feb. 2015.
International Searching Authority in connection with PCT/US2020/065276 filed Dec. 16, 2020, "The International Search Report and the Written Opinion of the International Searching Authority, or the Declaration", 17 pages, mailed Mar. 22, 2021.
Briganti et al., "Effect of Urea on Micellar Properties of Aqueous Solutions of Nonionic Surfactants," The Journal of Physical Chemistry, 1991, vol. 95, No. 22, pp. 8989-8995.
Roy et al. "Functions of hydrotropes (sodium salicylate, praline, pyrogallol, resorcinol and urea) in solution with special reference to amphiphile behaviors." Colloids and Surfaces A: Physicochemical and Engineering Aspects, vol. 203, 155-166, 2002.
Abdel-Wahab et al., "Increase Product Quality for a Car-Wash Shampoo Concentrate," American Journal of Applied and Industrial Chemistry, 2022, vol. 6, No. 2, pp. 31-35.
Blagojevic et al., "Performance and Efficiency of Anionic Dishwashing Liquids with Amphoteric and Nonionic Surfactants," Journal of Surfactants and Detergents, 2016, vol. 19, pp. 363-372.
Diversey, "SURETM Cleaner Disinfectant," Safety Data Sheet, May 27, 2018, Version 01.3, pp. 1-11.
International Search Report in PCT/US2024/022576, mailed Jul. 23, 2024, 6 pages.
Mintel, "Toilet Bowl Cleaner," Hangzhou Kleenmax Houseware, Record ID 10362932, Nov. 2022, 4 pages.

\* cited by examiner
† cited by third party

| Formula | Cytotoxicity (log10 CD50/mL) | Titre Virus Control (log 10 TCID 50/mL) | Virus titre (log 10 TCID 50/mL) after | | | | | Adenovirus Type 5 Log Reductions (EN 14476, 1% product dilutions, clean (0.3g/L BSA)) | | | | |
|---|---|---|---|---|---|---|---|---|---|---|---|---|
| | | | 1min | 5min | 15min | 30min | 60min | 1min | 5min | 15min | 30min | 60min |
| No Anionic Control | 1.5 | 8.00 | n.d. | 7.75 | 8.38 | n.d. | n.d. | n.d. | 0.25 | 0 | n.d. | n.d. |
| Dowfax C6L | 1.5 | 8.00 | n.d. | 6.13 | ≤2.88 | n.d. | n.d. | n.d. | 1.88 | 5.13 | n.d. | n.d. |
| Dowfax 8390 | 1.5 | 8.00 | n.d. | 3.50 | ≤2.5 | n.d. | n.d. | n.d. | 4.5 | 5.5 | n.d. | n.d. |
| Dowfax 3B2 | 1.5 | 8.00 | n.d. | ≤2.5 | ≤2.5 | n.d. | n.d. | n.d. | 5.5 | 5.5 | n.d. | n.d. |
| AOS | 1.5 | 8.00 | n.d. | ≤2.5 | ≤2.5 | n.d. | n.d. | n.d. | 5.5 | 5.5 | n.d. | n.d. |
| SLES, lactic only | 2.5 | 8.00 | n.d. | ≤2.5 | ≤2.5 | n.d. | n.d. | n.d. | 5.5 | 5.5 | n.d. | n.d. |
| DOSS, lactic only | 1.5 | 8.00 | n.d. | ≤2.5 | ≤2.5 | n.d. | n.d. | n.d. | 5.5 | 5.5 | n.d. | n.d. |
| No Anionic Control | 2.5 | 8.00 | n.d. | 7.13 | 7.75 | n.d. | n.d. | n.d. | 0.88 | 0.25 | n.d. | n.d. |

Legend
XXX = ≤3
--- = 3-3.99
/// = ≥4
n.d. = Not Done

FIG. 2

| Formula | Cytotoxicity (log10 CD50/mL) | Titre Virus Control (log 10 TCID 50/mL) | Virus titre (log 10 TCID 50/mL) after | | | | | MNV Log Reductions (EN 14476, 1% product dilutions, clean (0.3g/L BSA)) | | | | | |
|---|---|---|---|---|---|---|---|---|---|---|---|---|---|
| | | | 1min | 5min | 15min | 30min | 60min | 1min | 5min | 15min | 30min | 60min |
| No Anionic Control | 1.5 | 8.38 | n.d. | 8.13 | 8.00 | 8.25 | 8.38 | n.d. | 0.25 | 0.38 | 0 | 0 |
| Dowfax C6L | 1.5 | 8.38 | n.d. | 8.25 | 8.13 | 8.25 | 8.13 | n.d. | 0.13 | 0.25 | 0 | 0.06 |
| Dowfax 8390 | 1.5 | 8.38 | n.d. | 7.88 | 7.75 | 7.00 | 6.75 | n.d. | 0.5 | 0.63 | 1.19 | 1.44 |
| Dowfax 3B2 | 1.5 | 8.38 | n.d. | 8.25 | 7.88 | 7.63 | 7.88 | n.d. | 0.13 | 0.5 | 0.57 | 0.32 |
| AOS | 1.5 | 8.38 | n.d. | 3.63 | ≤2.5 | ≤2.5 | ≤2.5 | n.d. | 4.75 | 5.88 | ≥5.69 | ≥5.69 |
| SLES, lactic only | 2.5 | 8.38 | n.d. | 7.13 | 4.88 | 4.75 | ≤3.88 | n.d. | 1.25 | 3.5 | 3.44 | ≥4.32 |
| DOSS, lactic only | 1.5 | 8.38 | n.d. | 7.38 | 6.63 | 5.75 | 5.00 | n.d. | 1 | 1.75 | 2.44 | 3.19 |

Legend: XXX = ≤3; ---- = 3-3.99; /// = ≥4; n.d. = Not Done

FIG. 3

| Formulation | Cytotoxicity (log10 CD50/mL) | Titre Virus Control (log 10 TCID 50/mL) | Virus titre (log 10 TCID 50/mL) after | | | | | MNV Log Reductions (EN 14476, 1% product dilutions, clean (0.3g/L BSA) | | | | | |
|---|---|---|---|---|---|---|---|---|---|---|---|---|---|
| | | | 1min | 5min | 15min | 30min | 60min | 1min | 5min | 15min | 30min | 60min |
| LAS Control | 2.5 | 7.5 | 5.13 | ≤2.63 | ≤2.5 | ≤2.5 | ≤2.5 | 2.38 | ≥4.88 | ≥5.00 | ≥5.00 | ≥5.00 |
| No Anionic Control | 1.5 | 7.5 | 8 | 7.88 | 8 | 7.75 | 8 | 0 | 0 | 0 | 0 | 0 |
| AOS | 2.5 | 8.13 | 7 | 4.13 | ≤2.5 | ≤2.5 | ≤2.5 | 1.13 | 4 | ≥5.63 | ≥5.63 | ≥5.63 |
| AOS | 1.5 | 8.13 | 7.88 | 6.13 | 3.75 | ≤2.75 | ≤2.5 | 0.25 | 2 | 4.38 | ≥5.63 | ≥5.63 |
| AOS | 1.5 | 8.13 | 8.25 | 7.38 | 5.75 | 4.38 | ≤3.38 | 0 | 0.75 | 2.38 | 3.75 | ≥4.75 |
| SAS | 1.5 | 7.5 | 6.88 | 3.75 | ≤2.5 | ≤2.5 | ≤2.5 | 0.63 | 3.75 | ≥5.00 | ≥5.00 | ≥5.00 |
| Dowfax 8390 | 1.5 | 7.5 | 8.25 | 7.75 | 7.63 | 6.75 | 5.63 | 0 | 0 | 0 | 0.75 | 1.88 |
| SLES | 2.5 | 7.5 | 7.75 | 7.13 | 5.38 | 4.13 | 3.88 | 0 | 0.38 | 2.13 | 3.38 | 3.63 |
| SLS | 2.5 | 8 | 7.5 | 7 | 5.13 | ≤2.63 | ≤2.5 | 0.5 | 1 | 2.88 | ≥5.38 | ≥5.50 |
| DOSS | 1.5 | 8 | 7.88 | 7.75 | 7.13 | 6.25 | 5.88 | 0.13 | 0.25 | 0.88 | 1.75 | 2.13 |
| SOA | 1.5 | 8 | 8.25 | 8.25 | 7.5 | 7.38 | 6.88 | 0 | 0 | 0.5 | 0.63 | 1.13 |

Legend
XXX = ≤3
--- = 3-3.99
/// = ≥4
n.d. = Not Done

FIG. 4

ANIONIC SURFACTANT IMPACT ON VIRUCIDAL EFFICACY

CROSS-REFERENCE TO RELATED APPLICATIONS

This application claims priority under 35 U.S.C. § 119 to provisional application U.S. Ser. No. 62/948,378 filed Dec. 16, 2019, herein incorporated by reference in its entirety. The entire contents of this patent application are hereby expressly incorporated herein by reference including, without limitation, the specification, claims, and abstract, as well as any figures, tables, or drawings thereof.

FIELD OF THE INVENTION

The invention relates to virucidal compositions including an alpha olefin sulfonate anionic surfactant and at least one acid. In particular, the virucidal compositions provide a composition efficacious for disinfecting against Murine Norovirus, having acceptable use solution pH that do not require use of personal protective equipment (PPE), are surface compatible and do not result in streaky, hazy or tacky residues on treated surfaces. The compositions provide effective alternatives to quaternary ammonium compounds. Methods of using a virucidal composition are also provided.

BACKGROUND OF THE INVENTION

Viral pathogens are an increasing public health concern. Pathogenic viruses present a significant health concern as they are able to persist on surfaces for long periods of time and require complete and reliable inactivation in order to stop disease transmission. Viruses can be identified according to a hierarchy that correspondences with the level of resistance to being inactivated. The three viral subgroups include small non-enveloped, large non-enveloped, and enveloped viruses. A virucidal product that is able to inactivate a small, non-enveloped virus is also able to inactivate any large, non-enveloped virus or any enveloped virus. Similarly, a virucidal product that can inactivate a large, non-enveloped virus is also able to inactivate any enveloped virus. Accordingly, it is desirable to identify and develop compositions that can inactivate small, non-enveloped viruses to then be able to have corresponding efficacy across the viral hierarchy. Norovirus is an exemplary small, non-enveloped virus in need of additional virucidal compositions for surface treatment.

Norovirus is an exemplary small, non-enveloped virus in need of additional antimicrobial compositions for surface treatment. The non-enveloped Norovirus (NoV), also known previously as "Norwalk-Like Virus" (NLV) or small round structured virus, is the most important viral pathogen of epidemic acute gastroenteritis that occurs in both developed and developing countries. NoV belongs to the Caliciviridae family and are icosahedral, single stranded, positive-sense RNA viruses whose capsids are composed of 180 copies of a single major structural protein. Noroviruses are estimated to cause 23 million cases of acute gastroenteritis in the United States alone per year, and are the leading cause of gastroenteritis in the United States. Of viruses, only the common cold is reported more often than viral gastroenteritis (norovirus). Norovirus causes nausea, vomiting (sometimes accompanied by diarrhea), and stomach cramps. This infection typically is spread from person to person by direct contact.

Noroviruses are very highly contagious and can spread easily from person to person. People can become infected with the norovirus in several ways, including, eating food or drinking liquids that are contaminated with norovirus; touching surfaces or objects contaminated with norovirus, and then placing their hands in their mouths; or having direct contact with another person who is infected and showing symptoms (for example, when caring for someone who is ill, or sharing foods or eating utensils with someone who is ill). During outbreaks of norovirus gastroenteritis, several modes of transmission have been documented, for example, initial foodborne transmission in a restaurant, followed by secondary person-to-person transmission to household contacts.

A method for propagating human norovirus in a cell culture is not widely available and is with limitations. As a result, studies to evaluate methods of inactivating norovirus often utilize surrogate viruses including feline calicivirus (FCV) in cats, murine norovirus (MNV) in mice, porcine enteric calicivirus (PEC) in pigs, and Tulane virus (TuV) in rhesus macaques. FCV has been a classic stand-in for norovirus as it has been cultured for decades.

It is well known in the art that different norovirus surrogates have different resistance to different inactivation methods. FCV is recognized as being one of the most susceptible to various inactivation methods, including low pH. MNV is recognized as being acid resistant. Acid resistant surrogates best represent enteric viruses (such as human norovirus) because they are able to survive acidic pH's in the stomach and reach target cells in the small intestine for infectivity. Additionally, in comparison to FCV, MNV is genetically closer to human norovirus than FCV. With that in mind, an acid resistant norovirus surrogate such as MNV that is more genetically related to human norovirus is a more relevant surrogate for studying the environmental survival of human norovirus than FCV.

Quaternary ammonium compounds have become a commonplace antimicrobial and are widely used within the foodservice industry for food contact sanitizing and disinfectant applications with disinfection claim sets requiring a follow-up rinse step. However, recent regulatory scrutiny over quaternary ammonium compounds may change the utilization of these sanitizing and disinfectant compositions.

Products having a no-rinse capability are desirable, although they present challenges due to regulatory requirements for all active and inert ingredients to have a list tolerance designated for chemical substances used as ingredients in antimicrobial pesticide formulations applied to food-contact surfaces in public eating places, dairy-processing equipment, and food-processing equipment and utensils. Various commercially-available products exist in the marketplace that provide no-rinse options for Norovirus, including for example, Purell Professional Food Service Sanitizer as disclosed in U.S. Pat. No. 8,143,309 and Pure Bioscience Pure Hard Surface as disclosed in U.S. Pat. Nos. 6,197,814 and 6,583,176, the entire contents of which are incorporated by reference in their entirety. A further commercial example is Sarafan Speed, an EU product that is an alcohol-based no-rinse virucidal product. However, there are various challenges presented by the products. For example, various products present flammability concerns, impart hazy and/or tacky residues and/or poor surface appearance, having limited compatibility with soft metal surfaces (including aluminum) and are only available as ready-to-use (RTU) formulations instead of concentrates and/or solids, which limits applications of their use. As a result, there are various limitations which set in place a need for improved compositions.

Accordingly, it is an objective of the compositions and methods to provide a product that can offer no-rinse disinfection. In such embodiments a rinse step can be excluded from the methods. Similarly, in such embodiments a wiping step can be further excluded from the methods. It is a further objective of the compositions and methods to provide a product that provides disinfection without the use of quaternary ammonium compounds.

A further object of the compositions and methods is to provide virucidal efficacy against Murine Norovirus in addition to other viruses (enveloped and non-enveloped viruses), to ensure adequate disinfection against human norovirus.

A still further object of the compositions and methods is to provide virucidal efficacy, including short contact time, preferably 60 minutes or less, more preferably 30 minutes or less, more preferably 10 minutes or less, still more preferably 5 minutes or less, and most preferred 1 minute or less. In some embodiments, the short contact times are achieved with clean conditions. In other embodiments, the short contact times are achieved with dirty or soiled conditions.

A further object of the compositions and methods is a treatment option having a use solution pH that does not require the use of personal protective equipment (PPE).

A still further object of the compositions and methods is to provide a synergistic combination of an alpha olefin sulfonate anionic surfactant and at least one acid, wherein the acid can be a strong acid, a weak acid or combinations thereof.

A still further object is to provide both solid and liquid compositions.

Other objects, advantages and features of the present invention will become apparent from the following specification taken in conjunction with the accompanying drawings.

BRIEF SUMMARY OF THE INVENTION

An advantage of the virucidal compositions include the dilutable, non-flammable, disinfecting composition efficacy against microbial pathogens, including viruses such as Murine Norovirus, while providing surface compatible formulations that work in short contact times, including less than 60 minutes, less than 30 minutes, less than 10 minutes, less than 5 minutes, less than 1 minute, less than about 30 seconds, or even less than about 15 seconds against various viral pathogens. As the regulatory requirements in jurisdictions vary depend upon the contact times required for efficacy against viral pathogens it is beneficial that the virucidal compositions can have efficacy within a matter of seconds (e.g. less than about 15 seconds) and also while being surface compatible for longer contact times of up to at least 60 minutes. It is a further advantage of the compositions and methods that use solution pH do not require a user to employ PPE. As still further benefits, the compositions are suitable for use as hard surface antimicrobial compositions, namely virucidal compositions that are an alternative to quaternary ammonium compounds.

In an embodiment, an antimicrobial composition comprises at least one acid, wherein the acid is a strong acid, weak acid and/or combination thereof; at least one alpha olefin sulfonate anionic surfactant; and water for liquid compositions, wherein the composition is a liquid or solid concentrate having an acidic pH at a use composition from about 1.5 to about 4.

In a further embodiment, the alpha olefin sulfonate is a C8-C22 alpha olefin sulfonate, or a C8-C16 alpha olefin sulfonate. In a further embodiment the acids comprise lactic acid and methane sulfonic acid. In further embodiments the acid(s) is a single or combination of weak acids in combination with the alpha olefin sulfonate surfactant. In still further embodiments the acid(s) is a single or combination of strong acids in combination with the alpha olefin sulfonate surfactant. In further embodiments, the compositions also include an alkoxylated nonionic surfactant having an EO/PO block copolymer.

In further embodiments, methods of using a virucidal composition comprise: contacting the virucidal composition to a surface in need of treatment, and inactivating a viral population, wherein the antiviral inactivation is at least a 3 log reduction to complete inactivation within less than about 60 minutes, less than about 30 minutes, less than about 5 minutes, less than 1 minute, less than about 30 seconds, or even less than about 15 seconds, and wherein the method optionally does not require a rinse step. In embodiments, the contacting is by wiping, dipping, immersing, or spraying, and wherein the surface is a hard surface, a precleaned hard surface and/or a soiled surface that is contaminated with a viral population.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 2 shows antiviral efficacy results of the various anionic chemistries against adenovirus, wherein ≥4 log kill at 15 minutes is required for antiviral efficacy.

FIG. 3 shows antiviral efficacy results of the various anionic chemistries against MNV, wherein ≥4 log kill at 15 minutes is required for antiviral efficacy.

FIG. 4 shows antiviral efficacy results of the various anionic chemistries against MNV at dilution rates below 1% and shorter contact times to test for ≥4 log kill required for antiviral efficacy.

Figure 1:
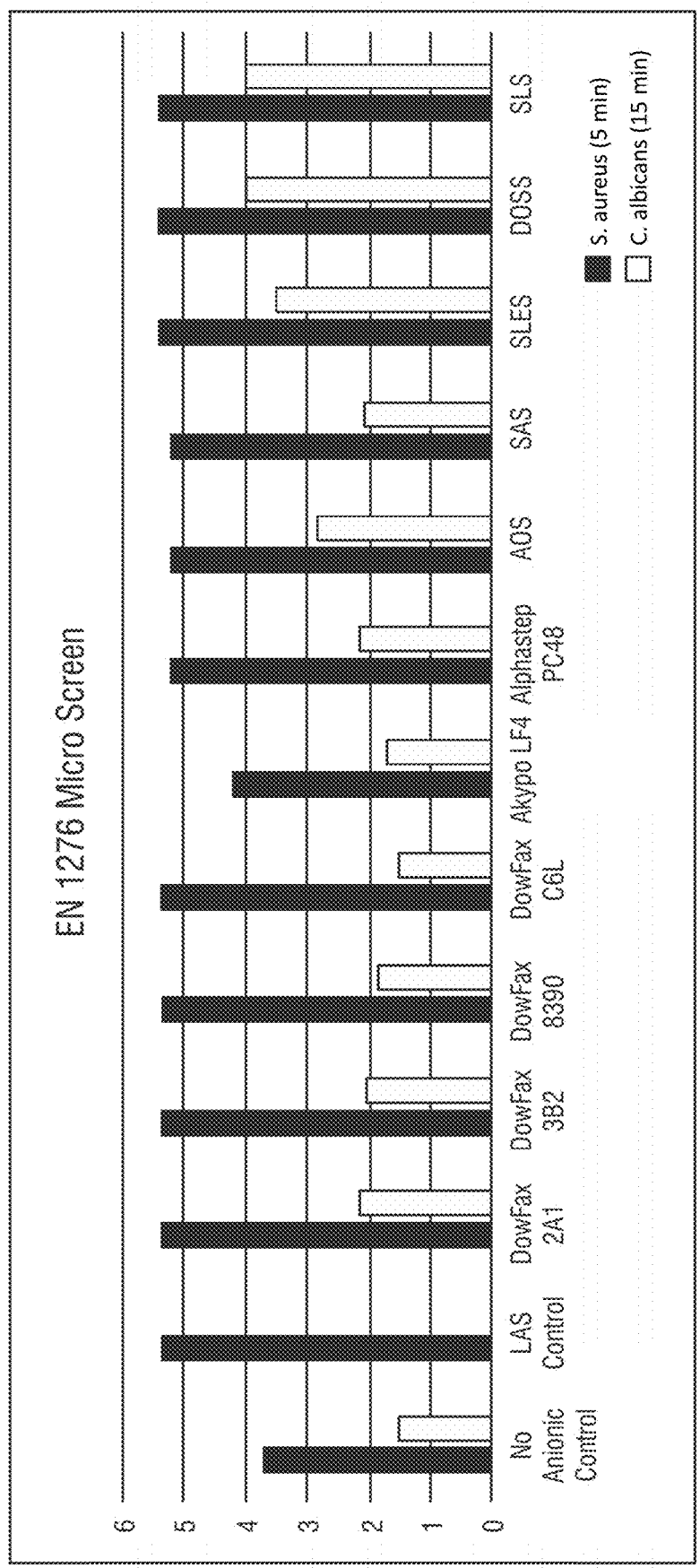
FIG. 1 shows bactericidal efficacy of the various anionic chemistries analyzed herein in comparison to a negative (no anionic) control and a positive LAS control.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The present invention relates to liquid and solid antimicrobial compositions providing efficacy against microbial and viral pathogens while providing surface compatible formulations that do not leave hazy, streaky, or tacky residues on treated surfaces and do not require PPE. In some embodiments the compositions provide no-rinse efficacy against viral pathogens including MNV. The embodiments are not limited to particular compositions and methods of use thereof, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

Differentiation of antimicrobial "-cidal" or "-static" activity, the definitions which describe the degree of efficacy, and the official laboratory protocols for measuring this efficacy are considerations for understanding the relevance of antimicrobial agents and compositions. Antimicrobial compositions can affect two kinds of microbial cell damage. The first is a lethal, irreversible action resulting in complete microbial cell destruction or incapacitation. The second type of cell damage is reversible, such that if the organism is rendered free of the agent, it can again multiply. The former is termed microbiocidal and the later, microbistatic. A sanitizer and a disinfectant are, by definition, agents which provide antimicrobial or microbiocidal activity. In contrast, a preservative is generally described as an inhibitor or microbistatic composition. As referred to herein, antimicrobial compositions are further suitable for cidal activity against viral pathogens, including for example, Norovirus and Murine Norovirus, including use of EN14476 at 18° C.-25° C. (under clean or dirty conditions).

As used herein, the term "cleaning" refers to a method used to facilitate or aid in soil removal, bleaching, microbial population reduction, rinsing, and any combination thereof.

As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

The term "commercially acceptable cleaning performance" refers generally to the degree of cleanliness, extent of effort, or both that a typical consumer would expect to achieve or expend when using a cleaning product or cleaning system to address a typical soiling condition on a typical substrate. This degree of cleanliness may, depending on the particular cleaning product and particular substrate, correspond to a general absence of visible soils, or to some lesser degree of cleanliness. Cleanliness may be evaluated in a variety of ways depending on the particular product being used and the particular surface being cleaned, and normally may be determined using generally agreed industry standard tests or localized variations of such tests. In some embodiments, the methods providing virucidal efficacy also provide commercially acceptable cleaning performance while ensuring the formulations do not leave hazy, streaky, or tacky residues on treated surfaces.

As used herein, the term "disinfectant" refers to an agent that kills all vegetative cells including most recognized pathogenic microorganisms. In an embodiment, a disinfectant according to U.S. standards can use the procedure described in *A.O.A.C. Use Dilution Methods*, Official Methods of Analysis of the Association of Official Analytical Chemists, paragraph 955.14 and applicable sections, 15th Edition, 1990 (EPA Guideline 91-2). As used herein, the term "high level disinfection" or "high level disinfectant" refers to a compound or composition that kills substantially all organisms, except high levels of bacterial spores, and is affected with a chemical germicide cleared for marketing as a sterilant by the Food and Drug Administration. As used herein, the term "intermediate-level disinfection" or "intermediate level disinfectant" refers to a compound or composition that kills mycobacteria, most viruses, and bacteria with a chemical germicide registered as a tuberculocide by the Environmental Protection Agency (EPA). As used herein, the term "low-level disinfection" or "low level disinfectant" refers to a compound or composition that kills some viruses and bacteria with a chemical germicide registered as a hospital disinfectant by the EPA.

In an embodiment, a disinfectant according to EU standards is as set forth in DIRECTIVE 98/8/EC OF THE EUROPEAN PARLIAMENT AND OF THE COUNCIL of 16 Feb. 1998, and Guidance on the Biocidal Products Regulation Volume II Efficacy—Assessment and Evaluation (Parts B+C) Version 3.0 April 2018—ECHA (European Chemicals Agency), each of which are herein incorporated by reference in their entirety.

A disinfectant can include any one of four groups of biocidal products with five defined product types for products that reduces the number of microorganisms in or on an inanimate matrix-achieved by the irreversible action of a product. In an embodiment, the disinfectant products can be confirmed using a variety of recognized testing methods (CEN, OECD, ISO, etc.); see Guidance document Appendices 2 and 4. According to various embodiments of the methods and compositions described herein, the EN1276 methodology was used to demonstrate bactericidal performance with a 5 log reduction requirement and the EN14476 methodology was used to demonstrate viricidal performance with a 4 log reduction requirement.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

The term "hard surface" refers to a solid, substantially non-flexible surface such as a countertop, tile, floor, wall, panel, window, plumbing fixture, kitchen and bathroom furniture, appliance, engine, circuit board, and dish. Hard surfaces may include for example, health care surfaces and food processing surfaces.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.), or patient-care equipment (such as respirators, diagnostic equipment, shunts, body scopes, wheelchairs, beds, etc.), or surgical and diagnostic equipment. Health care surfaces include articles and surfaces employed in animal health care.

The term "improved cleaning performance" refers generally to achievement by a substitute cleaning product or substitute cleaning system of a generally greater degree of cleanliness or with generally a reduced expenditure of effort, or both, when using the substitute cleaning product or substitute cleaning system rather than the conventional cleaning product to address a typical soiling condition on a typical substrate. This degree of cleanliness may, depending on the particular cleaning product and particular substrate, correspond to a general absence of visible soils, along with treated surfaces that do not have hazy, streaky, or tacky residues.

The terms "include" and "including" when used in reference to a list of materials refer to but are not limited to the materials so listed.

As used herein, the term "instrument" refers to the various medical or dental instruments or devices that can benefit from cleaning/virucidal treatment as described herein.

As used herein, the term "virucidal" refers to an agent that reduces the number of viruses on a surface or substrate. In an embodiment, virucidal compositions will provide at least a 3-log order reduction, or preferably a 5-log order reduction, or more preferably a complete inactivation of viruses. These reductions can be evaluated using a procedure set out in ASTM E1053 Standard Test Method for Efficacy of Virucidal Agents Intended for Inanimate Environmental Surfaces; US standards are set forth in EPA 810.2200; EP standards are set forth in EN 14476, each of which are herein incorporated by reference in its entirety. The outlined log reductions can be achieved over various periods of time (which can vary according to contact time requirements set forth in various jurisdictions), including for example less than about 60 minutes, less than about 30 minutes, less than about 5 minutes, less than 1 minute, less than about 30 seconds, or even less than about 15 seconds. According to this reference a virucidal composition should provide a 99.9% reduction (3-log order reduction) for virucidal activity.

The term "virus", as used herein refers to a type of microorganism that can include both pathogenic and non-pathogenic viruses. Pathogenic viruses can be classified into two general types with respect to the viral structure: enveloped viruses and non-enveloped viruses. Some well-known enveloped viruses include herpes virus, influenza virus; paramyxovirus, respiratory syncytial virus, corona virus, HIV, hepatitis B virus, hepatitis C virus and SARS-CoV virus. Non-enveloped viruses, sometimes referred to as "naked" viruses, include the families Picornaviridae, Reoviridae, Caliciviridae, Adenoviridae and Parvoviridae. Members of these families include rhinovirus, poliovirus, adenovirus, hepatitis A virus, norovirus, papillomavirus, and rotavirus. It is known in the art that "enveloped" viruses are relatively sensitive and, thus, can be inactivated by commonly used disinfectants. In contrast, non-enveloped viruses are substantially more resistant to conventional disinfectants and are significantly more environmentally stable than enveloped viruses.

The term "norovirus" is meant to refer to the human norovirus (referred to simply as norovirus) which is in the family Caliciviridae, which is the leading cause of acute nonbacterial gastroenteritis. There are various surrogates commonly used for norovirus as to date, human norovirus cannot be grown in cell culture. Norovirus has a low infectious dose (10 to 100 virus particles) and environmental contamination prolongs outbreaks. Surfaces, serving dishes or containers, utensils, and food handled by ill persons who are not practicing adequate personal hygiene before preparing food may also contribute to illness. Feline calicivirus (FCV), from the genus *Vesivirus*, can be propagated in cell culture, it has been extensively studied as a surrogate for human norovirus in environmental survival and inactivation studies. However, FCV is transmitted by the respiratory route and is inactivated at a relatively low pH, and hence, it may not predict human norovirus environmental stability or inactivation. Mouse norovirus 1 (MNV-1) has been propagated in cell culture and causes a lethal infection in mice that presents as hepatitis, pneumonia, or inflammation of the nervous system and is therefore very different from the clinical presentation of the human norovirus; however, MNV-1 is shed in mouse feces and is commonly transmitted by the fecal-oral route. The genetic relatedness of MNV-1 to norovirus combined with its ability to survive under gastric pH levels (minimal loss of infectivity at pH 2) makes this virus a relevant surrogate for studying environmental survival of norovirus. The MNV-1 is able to survive low pH and is superior in acid tolerance in comparison to FCV.

As used herein, the term "sanitizer" refers to an agent that reduces the number of bacterial contaminants to safe levels as judged by public health requirements. In an embodiment, sanitizers for use in this invention will provide at least a 3-log reduction and more preferably a 5-log order reduction. These reductions can be evaluated using a procedure set out in *Germicidal and Detergent Sanitizing Action of Disinfectants*, Official Methods of Analysis of the Association of Official Analytical Chemists, paragraph 960.09 and applicable sections, 15th Edition, 1990 (EPA Guideline 91-2). According to this reference a sanitizer should provide a 99.999% reduction (5-log order reduction) within 30 seconds at room temperature, 25±2° C., against several test organisms.

As used herein, the term "soil" refers to polar or non-polar organic or inorganic substances including, but not limited to carbohydrates, proteins, fats, oils and the like. These substances may be present in their organic state or complexed to a metal to form an inorganic complex.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "threshold agent" refers to a compound that inhibits crystallization of water hardness ions from solution, but that need not form a specific complex with the water hardness ion. Threshold agents include but are not limited to a polyacrylate, a polymethacrylate, an olefin/maleic copolymer, and the like.

As used herein, the term "waters" includes various water sources. Water temperatures can range from about 40° F.-160° F., about 60° F.-140° F., or about 70° F.-140° F.

The term "water soluble" refers to a compound that can be dissolved in water at a concentration of more than 1 wt. %. The terms "sparingly soluble" or "sparingly water soluble" refer to a compound that can be dissolved in water only to a concentration of 0.1 to 1.0 wt. %. The term "water insoluble" refers to a compound that can be dissolved in water only to a concentration of less than 0.1 wt. %.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present invention may comprise, consist essentially of, or consist of the components and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

Virucidal Compositions

Exemplary ranges of the virucidal compositions are shown in Tables 1A-1C showing liquid concentrate formulations on a weight percentage basis and Table 2 showing solid formulations on a weight percentage basis.

TABLE 1A (liquid concentrate formulations)

| Material | First Exemplary Range wt-% | Second Exemplary Range wt-% | Third Exemplary Range wt-% | Fourth Exemplary Range wt-% |
|---|---|---|---|---|
| Acid(s) | 10-80 | 20-80 | 30-70 | 40-70 |
| Alpha Olefin Sulfonate Anionic Surfactant | 0.1-50 | 1-50 | 10-50 | 20-45 |
| Water | to 100% | to 100% | to 100% | to 100% |
| Additional Functional Ingredients (e.g. nonionic surfactant) | 0-20 | 1-20 | 1-15 | 1-10 |

TABLE 1B (liquid concentrate formulations)

| Material | First Exemplary Range wt-% | Second Exemplary Range wt-% | Third Exemplary Range wt-% | Fourth Exemplary Range wt-% |
|---|---|---|---|---|
| Strong Acid | 1-30 | 1-25 | 5-25 | 5-20 |
| Weak Acid | 0-50 | 0-50 | 0-45 | 0-45 |
| Alpha Olefin Sulfonate Anionic Surfactant | 0.1-50 | 1-50 | 10-50 | 20-45 |
| Water | to 100% | to 100% | to 100% | to 100% |
| Additional Functional Ingredients (e.g. nonionic surfactant) | 0-38% | 0-19% | 0-13% | 0-6% |

TABLE 1C (liquid concentrate formulations)

| Material | First Exemplary Range wt-% | Second Exemplary Range wt-% | Third Exemplary Range wt-% | Fourth Exemplary Range wt-% |
|---|---|---|---|---|
| Strong Acid | 0-30 | 0-25 | 0-25 | 0-20 |
| Weak Acid | 10-50 | 15-50 | 20-50 | 20-45 |
| Alpha Olefin Sulfonate Anionic Surfactant | 0.1-50 | 1-50 | 10-50 | 20-45 |
| Water | to 100% | to 100% | to 100% | to 100% |
| Additional Functional Ingredients (e.g. nonionic surfactant) | 0-38% | 0-19% | 0-13% | 0-6% |

TABLE 2

(solid formulations)

| Material | First Exemplary Range wt-% | Second Exemplary Range wt-% | Third Exemplary Range wt-% | Fourth Exemplary Range wt-% |
|---|---|---|---|---|
| Acid(s) | 10-80 | 20-80 | 30-70 | 40-70 |
| Alpha Olefin Sulfonate Anionic Surfactant | 1-50 | 10-50 | 20-50 | 20-45 |
| Additional Functional Ingredients (e.g. hardening agent or solidification matrix, nonionic surfactant) | To 100% | To 100% | To 100% | To 100% |

The virucidal compositions may include concentrate compositions which can be diluted to form use compositions or ready to use (RTU) compositions. The solid virucidal compositions provide a use solution that is a dilutable liquid concentrate which can be further diluted to form use compositions or RTU compositions. Beneficially, the compositions overcome a limitation of the prior art in that dilutable concentrates can be provided. In general, a concentrate refers to a composition that is intended to be diluted with water to provide a use solution that contacts an object to provide the desired cleaning, antimicrobial efficacy, or the like. The antimicrobial composition and virucidal composition that contacts the articles can be referred to as a concentrate or a use composition (or use solution) dependent upon the formulation employed in the methods described herein. It should be understood that the concentration of the acids, anionic surfactant(s), and any additional functional ingredients, such as nonionic surfactants, in the composition will vary depending on whether the composition is provided as a concentrate or as a use solution. One skilled in the art can adjust % by weight of the compositions to arrive at a composition having a different dilution rate, which is within the scope of the disclosed compositions. Beneficially, within the ranges of actives, the compositions can be formulated to include a nearly or completely waterless liquid or solid composition.

A use solution may be prepared from the concentrate by diluting the solid or liquid concentrate with water at a dilution ratio that provides a use solution having desired virucidal properties. The water that is used to dilute the concentrate to form the use composition can be referred to as water of dilution or a diluent, and can vary from one location to another. The typical dilution factor is between approximately 1 and approximately 10,000. In an embodiment, the solid or liquid concentrate is diluted at a ratio of between about 1:10 and about 1:10,000 solid or liquid concentrate to water, between about 1:10 and about 1:1,000 solid or liquid concentrate to water, or between about 1:10 and about 1:510 solid or liquid concentrate to water.

In another embodiment, a concentrate can be diluted at a rate of from about ⅛ oz./gal. to about 12 oz./gal., from about ¼ oz./gal. to about 1 oz./gal., or from about ½ oz./gal. to about 1 oz./gal while providing sanitizing efficacy.

In another embodiment, a concentrate can be diluted at a rate of from about ⅛ oz./gal. to about 12 oz./gal., from about ½ oz./gal. to about 6 oz./gal., or from about 1 oz./gal. to about 4 oz./gal while providing virucidal efficacy.

In another embodiment, a concentrate can be diluted at a rate of from about ⅛ oz./gal. to about 12 oz./gal., from about ½ oz./gal. to about 6 oz./gal., or from about 1 oz./gal. to about 4 oz./gal while providing disinfecting efficacy.

In an embodiment, a diluted use solution is made from about a 0.5% to about a 3% by weight dilution of the liquid concentrate composition.

In an embodiment, a concentrate liquid composition has between about 20% to about 60% anionic surfactant, preferably between about 20% to about 40% anionic surfactant. In an embodiment, a liquid use composition provides up to about 6000 ppm anionic surfactant, or from about 10 ppm to about 6000 ppm anionic surfactant.

In an embodiment, the dilutable concentrate compositions provide a use solution pH from about 1.5 to about 4, from about 2 to about 4, from about 2.0 to about 3.5, or from about 2.0 to about 2.8, including a ranges therebetween.

The liquid compositions can be provided in various forms well appreciated by those skilled in the art. The compositions can also be manufactured to include a saturated antimicrobial wipe, such as a paper or cloth substrate having the liquid compositions saturated thereon. In embodiments, the liquid compositions are provided as liquid concentrates. In other embodiments, the liquid compositions are provided as ready to use liquids, such as for example a ready to use spray. Such ready to use applications provide from about 10 ppm to about 6000 ppm anionic surfactant. Such embodiments may further include additional functional ingredients, including for example solvent(s), defoamers, or the like. The addition of such components provide a desired viscoelasticity of the composition to allow for spraying, pumping, or desired dispensing. In some embodiments, it may be desired for dispensing a ready to use application that has foaming suitable for applying to vertical surfaces. Such foaming applications can include formulations that are ready to use (e.g. foaming triggers for dispensing) or dilutable concentrates.

The solid compositions can be provided in various forms well appreciated by those skilled in the art. The compositions can be manufactured to include a solid block, including pressed, extruded, cast, tableted, or the like. Solids can also include granulates and powders, including flowable powders. In certain embodiments the solids can also include applicable packaging (e.g. film, such as a PVA film). Beneficially, the solid compositions including a combination of acids and anionic surfactants provide efficacious and stable solid alternatives to extruded solids using quaternary ammonium compounds. Various forms and sizes of the solids can be included in addition to solid blocks, including for example, pucks, tablets, powders, granules, and the like. Various techniques for forming the solids can be employed, including for example use of a fluid bed and/or agglomeration to form solids from the liquids.

The solid composition may take forms as well as sizes. In an exemplary embodiment, solids can have a weight of between approximately 50 grams and approximately 250 grams, approximately 100 grams or greater, and between approximately 1 and approximately 10 kilograms. In certain embodiments, the solid compositions can include a unit dose, such as a tablet or puck. A unit dose refers to a solid composition unit sized so that the entire unit is used during a single application of use. When the solid composition is provided as a unit dose, it is typically provided as a cast solid, an extruded pellet, or a tablet having a size of between approximately 1 gram and approximately 50 grams. In other embodiments, the solid composition is provided in the form of a multiple-use solid, such as a block or a plurality of pellets, and can be repeatedly used to generate aqueous compositions for multiple applications or cleaning cycles. In certain embodiments, the solid composition is provided as a pressed solid, cast solid, an extruded block, or a tablet having a mass of between approximately 5 grams and approximately 10 kilograms. In certain embodiments, a multiple-use form of the solid composition has a mass between approximately 1 kilogram and approximately 10 kilograms.

The degree of hardness of the solid cast composition and/or a pressed solid composition may range from that of a fused solid product which is relatively dense and hard, for example, like concrete, to a consistency characterized as being a hardened paste. In addition, the term "solid" refers to the state of the composition under the expected conditions of storage and use of the solid cleaning composition. In general, it is expected that the composition will remain in solid form when exposed to temperatures of up to approximately 100° F., up to approximately 120° F., or up to approximately 125° F. while maintaining physical and dimensional stability. The dimensional stability of the solid composition is confirmed by a growth exponent of less than about 3% if heated at a temperature up to approximately 100° F. (40° C.), up to approximately 120° F. (50° C.), or up to approximately 140° F. (60° C.) for an extended period of time, such as at least 30 minutes, or at least one hour, up to two weeks, up to four weeks, up to six weeks, or up to eight weeks, and at a humidity between about 40-65%.

Acid

The compositions include at least one acid, which can include a strong or weak acid. In embodiments, the compositions include two acids. In such an aspect of a combination of acids, the acids can be a combination of a weak acid and a strong acid. In another aspect of a combination of acids, the acids can be a combination of two weak acids or two strong acids. For the purposes of this invention, an acid is a component that can be added to an aqueous system and result in a pH less than 7. Strong acids that can be used are acids which substantially dissociate an aqueous solution. "Weak" organic and inorganic acids are acids or acid components in which the first dissociation step of a proton from the acid moiety does not proceed essentially to completion when the acid is dissolved in water at ambient temperatures at a concentration within the range useful to form the present compositions.

Without wishing to be bound by theory, the acids of the compositions serve to protonate the lipid envelope and/or capsid of viruses and reducing the tendency of the membrane to electronically repel the anionic surfactants included in the virucidal compositions. Moreover, the acids disclosed herein facilitate the creation of a low pH buffer on the surface of a substrate, thereby prolonging the residual antimicrobial and virucidal activity of the compositions and products in which they are incorporated.

Exemplary strong acids suitable for use in the compositions include methane sulfonic acid, sulfuric acid, sodium hydrogen sulfate, phosphoric acid, phosphonic acid, nitric acid, sulfamic acid, hydrochloric acid, trichloroacetic acid, trifluoroacetic acid, toluene sulfonic acid, glutamic acid, and the like; alkane sulfonic acid, such as methane sulfonic acid, ethane sulfonic acid, linear alkyl benzene sulfonic acid, xylene sulfonic acid, cumene sulfonic acid and the like. In a preferred aspect, the compositions include a strong acid having a pKa less than about 2.5 to beneficially provide the acidic use compositions having a pH less than about 4, or preferably less than about 3. In an embodiment, the compositions include a strong acid in combination with the anionic surfactant, and optionally include a weak acid.

Exemplary weak acids suitable for use in the compositions including alpha hydroxycarboxylic acid, such as lactic acid, citric acid, tartaric acid, malic acid, gluconic acid, and the like; carboxylic acids, such as formic acid, acetic acid, propionic acid and the like; other common organic acids such as ascorbic acid, glutamic acid, levulinic acid, etc. could also be used. In a preferred aspect, the compositions include a weak acid having a pKa greater than about 2.5 to beneficially provide the acidic use compositions having a pH less than about 4, or preferably less than about 3. In an embodiment, the compositions include a weak acid in combination with the anionic surfactant, and optionally include a strong acid.

In certain embodiments, a combination of a strong acid with a weak acid result in surprisingly increased antimicrobial and virucidal efficiency. In a preferred embodiment, the acids comprise lactic acid and methane sulfonic acid. Without being limited to a particular mechanism of action, it may be desirable to have a buffered acidic composition. For example, if a surface in need of treatment is not sufficiently cleaned the compositions have a buffered composition by virtue of a combination of weak and strong acids will beneficially be able to support inactivation of pH sensitive organisms.

In an aspect, the compositions include from about 10 wt-% to about 80 wt-% of at least one acid, from about 20 wt-% to about 80 wt-% of at least one acid, from about 30 wt-% to about 70 wt-% of at least one acid, or from about 40 wt-% to about 70 wt-% of at least one acid. In such embodiments, the acid(s) can be strong acid(s) and/or weak acid(s). In addition, without being limited according to the invention, all ranges recited are inclusive of the numbers defining the range and include each integer within the defined range.

In certain aspects, the compositions include from about 0.1 wt-% to about 30 wt-% of a strong acid, from about 1 wt-% to about 30 wt-% of a strong acid, from about 1 wt-% to about 25 wt-% of a strong acid, from about 5 wt-% to about 25 wt-% of a strong acid, or from about 5 wt-% to about 20 wt-% of a strong acid.

In certain aspects, the compositions include from about 1 wt-% to about 50 wt-% of a weak acid, from about 10 wt-% to about 50 wt-% of a weak acid, from about 15 wt-% to about 50 wt-% of a weak acid, from about 20 wt-% to about 50 wt-% of a weak acid, or from about 20 wt-% to about 45 wt-% of a weak acid.

In certain aspect, the compositions include from about 0.1 wt-% to about 30 wt-% of a strong acid, from about 1 wt-% to about 30 wt-% of a strong acid, from about 1 wt-% to about 25 wt-% of a strong acid, from about 5 wt-% to about 25 wt-% of a strong acid, or from about 5 wt-% to about 20 wt-% of a strong acid, in combination with a weak acid, wherein the compositions include from about 1 wt-% to about 50 wt-% of a weak acid, from about 10 wt-% to about 50 wt-% of a weak acid, from about 15 wt-% to about 50 wt-% of a weak acid, from about 20 wt-% to about 50 wt-% of a weak acid, or from about 20 wt-% to about 45 wt-% of a weak acid. In addition, without being limited according to the invention, all ranges recited are inclusive of the numbers defining the range and include each integer within the defined range.

Anionic Sulfonate Surfactant

The compositions include at least one anionic sulfonate surfactant. In some embodiments the compositions include a combination of two anionic sulfonate surfactants. Anionic surfactants are surface active substances which are categorized by the negative charge on the hydrophobe; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and calcium, barium, and magnesium promote oil solubility.

In another embodiment the anionic sulfonate surfactant is an alkyl sulfonate, including linear and branched primary and secondary alkyl sulfonates, and the aromatic sulfonates with or without substituents. In an embodiment the anionic sulfonate surfactant is an alpha olefin sulfonate or its salts. Alpha olefin sulfonates are available as aqueous solutions, powders or as a solid anhydrous product. Preferred anionic sulfonates include C8-C22 alpha olefin sulfonates, or C8-C16 alpha olefin sulfonates.

In another embodiment the anionic sulfonate surfactant is a combination of an alpha olefin sulfonate or its salts and an alkane sulfonate, preferably sodium alkane sulfonate.

Beneficially, alpha olefin sulfonate surfactants are stable in hard water. They are clear stable solutions which is particularly appealing for customer use. In comparison other anionic surfactants, such as LAS are not stable in hard water and would form non-stable, cloudy solutions and/or precipitate out of solution.

In some embodiments, a combination of an anionic sulfonate surfactant with additional anionic surfactants, preferably powdered anionic surfactants, are combined for solid compositions.

In an aspect, the compositions include from about 0.1 wt-% to about 50 wt-% of the alpha olefin sulfonate anionic surfactant, from about 1 wt-% to about 50 wt-% of the alpha olefin sulfonate anionic surfactant, from about 10 wt-% to about 50 wt-% of the alpha olefin sulfonate anionic surfactant, from about 15 wt-% to about 50 wt-% of alpha olefin sulfonate anionic surfactant, from about 20 wt-% to about 50 wt-% of alpha olefin sulfonate anionic surfactant, from about 20 wt-% to about 45 wt-% of alpha olefin sulfonate anionic surfactant, or from about 25 wt-% to about 40 wt-% of alpha olefin sulfonate anionic surfactant. In preferred aspects, the solid compositions include from about 1 wt-% to about 50 wt-% of the alpha olefin sulfonate anionic surfactant, from about 10 wt-% to about 50 wt-% of the alpha olefin sulfonate anionic surfactant, from about 15 wt-% to about 50 wt-% of alpha olefin sulfonate anionic surfactant, from about 20 wt-% to about 50 wt-% of alpha olefin sulfonate anionic surfactant, from about 20 wt-% to about 45 wt-% of alpha olefin sulfonate anionic surfactant, or from about 25 wt-% to about 40 wt-% of alpha olefin sulfonate anionic surfactant. In addition, without being limited according to the invention, all ranges recited are inclusive of the numbers defining the range and include each integer within the defined range.

Additional Anionic Surfactants

In some embodiments, the compositions include two or more anionic surfactants. In embodiments, the compositions include the anionic alpha olefin sulfonate and an additional anionic surfactant, such as a sulfonated carboxylic acid ester, sulfate, carboxylate, or ethoxy carboxylate.

Exemplary additional anionic sulfonates include sulfonated carboxylic acid esters. In an aspect, suitable alkyl sulfonate surfactants include C8-C22 alkyl sulfonates, or preferably C8-C16 alkyl sulfonates or C10-C22 alkyl sulfonates. In an exemplary aspect, the anionic alkyl sulfonate surfactant is linear alkyl benzene sulfonic acid (LAS). The inclusion of additional anionic alkyl sulfonates may vary based on regulatory applicability for virucidal, sanitizing and/or disinfecting applications.

Anionic sulfate surfactants suitable for use in the compositions also include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Additional anionic surfactants suitable for the compositions include anionic carboxylate surfactants, those which have a carboxylic acid or an alpha hydroxyl acid group. Anionic carboxylate surfactants suitable for use in the compositions also include carboxylic acids (and salts), such as alkanoic acids (and alkanoates), ester carboxylic acids (including sulfonated carboxylic acid esters), ether carboxylic acids, sulfonated fatty acids, such as sulfonated oleic acid, and the like. In an aspect, suitable ester carboxylic acids include alkyl succinates, such as for example dioctyl sulfosuccinate. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R\text{—}O\text{—}(CH_2CH_2O)_n(CH_2)_m\text{—}CO_2X \qquad (3)$$

in which R is a $C_8$ to $C_{22}$ alkyl group or

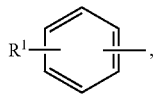

in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

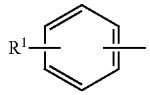

and $R^1$ is a $C_6$-$C_{12}$ alkyl group. In still yet other embodiments, $R^1$ is a $C_9$ alkyl group, n is 10 and m is 1.

Another class of anionic surfactant include the alpha sulfonated carboxylic acid esters, such as MC or PC-48 from Stepan.

In an aspect, the compositions include from about 0 wt-% to about 50 wt-% of the additional anionic surfactant, from about 0 wt-% to about 30 wt-% of the additional anionic surfactant, from about 0.1 wt-% to about 30 wt-% of the additional anionic surfactant, or from about 1 wt-% to about 30 wt-% of the additional anionic surfactant. In addition, without being limited according to the invention, all ranges recited are inclusive of the numbers defining the range and include each integer within the defined range.

Additional Functional Ingredients

The components of the virucidal compositions can further be combined with various additional functional components. In some embodiments, the virucidal compositions including the at least one acid and at least one anionic surfactant make up a large amount, or even substantially all of the total weight of the composition. For example, in some embodiments few or no additional functional ingredients are included therein.

In other embodiments, additional functional ingredients may be included in the compositions. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used.

In preferred embodiments, the compositions do not include quaternary ammonium compounds. In additional embodiments, the compositions do not include conventional Norovirus actives, including for example, ethanol, silver citrate, and/or electrolytic chlorine. In additional embodiments the compositions do not include alcohols and/or other organic solvents to beneficially provide a non-flammable product. In other embodiments, the compositions may include solidifying agents, defoaming agents, wetting agents, anti-redeposition agents, solubility modifiers, dispersants, rinse aids, metal protecting agents, stabilizing agents, corrosion inhibitors, sequestrants and/or chelating agents, threshold agent, fragrances and/or dyes, rheology modifiers or thickeners, hydrotropes or couplers, buffers, solvents, sensor indicators, and the like.

Hydrogen Peroxide

In some embodiments, the compositions include a hydrogen peroxide source (including hydrogen peroxide and/or precursors). It is known that solutions having about from up to 0.05 to 1.0 wt./wt. % hydrogen peroxide are effective for use as household and commercial disinfectants, bactericides, virucides, sanitizers and cleaners. Solutions having about 3-4 wt./wt. % are suitable for use as multi-purpose cleaners and bleach alternatives in healthcare facilities, households and commercial facilities. Solutions having about 6-8 wt./wt. % hydrogen peroxide are suitable for use as a sporicides, fungicides, virucides, bactericides, broad spectrum sanitizers, general purpose cleaners and bleach alternatives. The combination of hydrogen peroxide with the compositions described herein provides still further benefit to enhance antiviral efficacy.

The hydrogen peroxide source, including hydrogen peroxide aqueous solution and/or a precursor may be prepared as a concentrated aqueous solution. In some embodiments a concentrated aqueous solution, e.g. from up to 20 wt./wt. % hydrogen peroxide, is diluted when the concentrate composition is diluted. The hydrogen peroxide may alternatively be prepared in a dilute form, e.g. from 0.05 to 1.0 wt./wt. %. In other embodiments, a precursor to hydrogen peroxide may be employed, including for example perhydrate salts, including alkali metal salts such as sodium salts of perborate (usually mono- or tetra-hydrate), percarbonate, persulphate, perphosphate, persilicate salts and mixtures thereof. Examples of preferred precursors include sodium salts of perborate, percarbonate and mixtures thereof. Without being limited to a particular mechanism of action, hydrogen peroxide provides further benefit to the compositions described herein to increase antibacterial and antiviral efficacy.

In some embodiments, the compositions include about 0 wt-% to about 50 wt-%, between about 0.1 wt-% to about 50 wt-%, between about 1 wt-% to about 40 wt-%, between about 5 wt-% to about 40 wt-% hydrogen peroxide source.

Solidifying Agents

Solidifying agents (also referred to as hardening agents) can also be included in the solid compositions. Solidifying agents can include a compound or system of compounds, organic or inorganic, which significantly contribute to the uniform solidification of the solid composition. The solidifying agents should be capable of forming a homogeneous matrix with the active components of the solid composition when mixed and solidified to provide a uniform dissolution of the actives from the solid composition during use.

An exemplary solidifying agent includes urea. Urea may be in the form of prilled beads or powder. Prilled urea is generally available from commercial sources as a mixture of particle sizes ranging from about 8-15 U.S. mesh, as for example, from Arcadian Sohio Company, Nitrogen Chemicals Division. A prilled form of urea is preferably milled to reduce the particle size to about 50 U.S. mesh to about 125 U.S. mesh, particularly about 75-100 U.S. mesh, preferably using a wet mill such as a single or twin-screw extruder, a Teledyne mixer, a Ross emulsifier, and the like.

Additional solidifying agents may be an organic hardening agent, including for example: a polyethylene glycol (PEG) compound, suitable examples including solid polyethylene glycols of the general formula $H(OCH_2CH_2)nOH$, where n is greater than 15, particularly approximately 30 to approximately 1700, such as PEG 4000, PEG 1450, and PEG 8000, among others. Still further, PEG can include varying molecular weights, for example, molecular weight of about 1,400 to about 30,000. In certain embodiments, the solidifying agent includes or is solid PEG, for example PEG 1500 up to PEG 20,000. In certain embodiments, the PEG includes PEG 1450, PEG 3350, PEG 4500, PEG 8000, PEG 20,000, and the like. Suitable solid polyethylene glycols are commercially available from Union Carbide under the tradename CARBOWAX.

Additional solidifying agents may be an inorganic hardening agent, including for example: hydratable inorganic salts, including, but not limited to carbonates, sulfates and bicarbonates, which may be an alkali metal or alkali earth metal salt. Suitable salts include lithium, sodium, potassium, calcium, magnesium, iron, strontium, zinc, manganese, lanthanum, titanium, gallium, aluminum, cobalt, copper, molybdenum, rhenium, rhodium, scandium, tin and zirconium. Suitable metal salts include sodium, lithium, potassium salts including, but not limited to sulfates, chlorides, phosphates, acetates, nitrates, and carbonates. Particularly useful metals salts include lithium, sodium and potassium sulfates, chlorides and acetates. The following patents disclose various combinations of solidification, binding and/or hardening agents that can be utilized in the solid compositions of the present invention. The following U.S. patents are incorporated herein by reference in their entirety: U.S. Pat. Nos. 7,153,820; 7,094,746; 7,087,569; 7,037,886; 6,831,054; 6,730,653; 6,660,707; 6,653,266; 6,583,094; 6,410,495; 6,258,765; 6,177,392; 6,156,715; 5,858,299; 5,316,688; 5,234,615; 5,198,198; 5,078,301; 4,595,520; 4,680,134; RE32,763; and RE32818.

Still further, solidifying agents can include polymers and thickeners include natural gums such as xanthan gum, guar gum, or other gums from plant mucilage; polysaccharide based thickeners, such as alginates, starches, and cellulosic polymers (e.g., carboxymethyl cellulose); solid EO/PO block copolymers; polyacrylates; and hydrocolloids. In an embodiment, the thickener does not leave contaminating residue on the surface of an object. For example, the thickeners or gelling agents can be compatible with food or other sensitive products in contact areas.

The solidifying agents can be included in the compositions at range from about 0 wt-% to 70 wt-%, 0 wt-% to 50 wt-%, 0.01 wt-% to 30 wt-%, from about 0.01 wt-% to 20 wt-%, or from about 1 wt-% to about 20 wt-%.

Surfactants

In some embodiments, the compositions include an additional surfactant. Surfactants suitable for use with the compositions include, but are not limited to, nonionic surfactants, amphoteric surfactants, and/or zwitterionic surfactants. In some embodiments, the compositions include about 0 wt-% to about 40 wt-%, between about 0.1 wt-% to about 38 wt-%, between about 1 wt-% to about 20 wt-%, between about 1 wt-% to about 15 wt-% additional surfactant, or between about 1 wt-% to about 6 wt-% additional surfactant.

Nonionic Surfactants

Suitable nonionic surfactants suitable for use with the compositions of the present invention include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 (R-(EO)$_5$(PO)$_4$) and Dehypon LS-36 (R-(EO)$_3$(PO)$_6$); and capped alcohol alkoxylates, such as Plurafac LF221 and Tegoten EC11; mixtures thereof, or the like.

In an exemplary aspect, a nonionic surfactant available on the market under the trade name of "Pluronic" is included as an additional surfactant in the compositions. These compounds are formed by condensing ethylene oxide with a hydrophobic base formed by the condensation of propylene oxide with propylene glycol. The hydrophobic portion of the molecule has a molecular weight of from about 1,500 to 1,800. The addition of polyoxyethylene radicals to this hydrophobic portion tends to increase the water solubility of the molecule as a whole and the liquid character of the products is retained up to the point where the polyoxyethylene content is about 50 percent of the total weight of the condensation product.

The semi-polar type of nonionic surface active agents is another class of nonionic surfactant useful in compositions of the present invention. Semi-polar nonionic surfactants include the amine oxides, phosphine oxides, sulfoxides and their alkoxylated derivatives.

Amine oxides are tertiary amine oxides corresponding to the general formula:

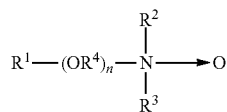

wherein the arrow is a conventional representation of a semi-polar bond; and $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkylene or a hydroxyalkylene group containing 2 to 3 carbon atoms; and n ranges from 0 to about 20. An amine oxide can be generated from the corresponding amine and an oxidizing agent, such as hydrogen peroxide.

Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" Cosmetics & Toiletries, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

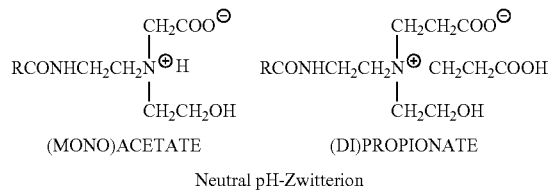

Neutral pH-Zwitterion

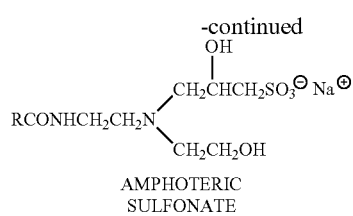

AMPHOTERIC SULFONATE wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R=C_8-C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na$)$_2$—$CH_2$—$CH_2$—OH or $C_{12}$-alkyl-C(O)—N(H)—$CH_2$—$CH_2$—$N^+$($CH_2$—$CO_2Na$)$_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

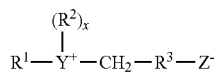

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

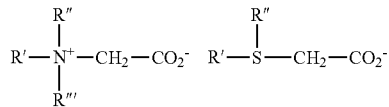

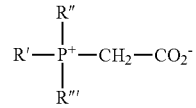

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2N^+ R^2SO^{3-}$, in which R is a $C_{6-18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references is herein incorporated in their entirety.

In an embodiment, the compositions of the present invention include a betaine. For example, the compositions can include cocoamido propyl betaine.

Defoaming Agents

Defoaming agents can also be included in the compositions. Generally, defoamers which can be used in accordance with the invention preferably include alcohol alkoxylates and EO/PO block copolymers. Defoamers can also include polyalkylene glycol condensates and propyl glycols, including polypropyl glycol. In some embodiments, the compositions can include antifoaming agents or defoamers which are of food grade quality given the application of the methods. To this end, one of the more effective antifoaming agents includes silicones. Silicones such as dimethyl silicone, glycol polysiloxane, methylphenol polysiloxane, trialkyl or tetralkyl silanes, hydrophobic silica defoamers and mixtures thereof can all be used in defoaming applications. These defoamers can be present at a concentration range from about 0.01 wt-% to 20 wt-%, 0.01 wt-% to 20 wt-%, from about 0.01 wt-% to 5 wt-%, or from about 0.01 wt-% to about 1 wt-%.

Methods of Use

The virucidal compositions are particularly well suited for treating surfaces in need of antimicrobial efficacy, including for example virucidal efficacy. In further aspects, the virucidal compositions are still further well suited for treating surfaces in need of virucidal efficacy against small, non-enveloped viruses, large, non-enveloped viruses and/or any enveloped viruses without the use of any quaternary ammonium compounds and/or sulfonated anionic surfactants having regulatory limitations. In a particular, aspect, the virucidal compositions are particularly well suited for treating surfaces in need of inactivating small, non-enveloped viruses. Methods of inactivating a viral population are provided; including methods of inactivating Murine Norovirus are encompassed according to the present disclosure.

The methods of use for antimicrobial, including antiviral, disinfection along with inactivating viruses, include a contacting step, wherein the virucidal compositions are applied to a surface in need of treatment. In an aspect, contacting the composition is to a surface contaminated with a virus. The contaminated surfaces can be precleaned and/or soiled. In a preferred aspect, the methods of use provide complete kill of a Norovirus. Beneficially, in an aspect, greater than a 99.9% reduction (3-log order reduction) in such population, greater than 99.99% reduction (4-log order reduction) in such populations, or greater than a 99.999% reduction (5-log order reduction) in the population of a Norovirus on a surface is achieved with a contact time of less than about 60 minutes, less than about 30 minutes, less than about 15 minutes, less than about 5 minutes, less than about 1 minute, less than about 30 seconds, or even less than about 15 seconds.

In a further aspect, contacting the virucidal composition can be to a food contact and/or non-food contact hard surface. Such surfaces can further include instruments, such as medical instruments. Surfaces can also include those cleaned in third-sink sanitizing, including various wares. In still further aspects, contacting the composition can be to a CIP (clean in place) application.

In still further aspects, contacting the composition can be to a ware wash machine, such as a ware wash application.

In still further aspects, contacting the composition can be to a third sink sanitizing application or first sink disinfecting detergent application. In a still further aspect, the contacting is beneficially compatible with first sink detergents, such that a third sink sanitizing step could be used as a water recycle to combine with a first sink detergent. This is a benefit over conventional compositions containing quaternary ammonium compounds which are not compatible with first sink detergents.

In still further aspects, contacting the composition can be to a tissue surface, including tissue treatment applications. Exemplary tissue surfaces include mammalian skin, such as animal or human skin, including for example human hands.

The various surfaces to which the compositions can be applied can include any conventional application means. Application can include, for example, by wiping, spraying, dipping, immersing, or the like. The contacting can also include providing a solid to be first dissolved in water to form a solution for the contacting. The contacting step allows the composition to contact the soiled surface for a predetermined amount of time. The amount of time can be sufficient to allow, including from a few seconds to an hour, from about 15 seconds, or about 30 seconds to about 60 minutes, or any range therebetween. In a preferred embodiment, the contact time required for antiviral efficacy is less than about 30 minutes, less than about 15 minutes, less than about 10 minutes, less than about 5 minutes, or less than about 1 minute. In still further embodiments, the contact time required for antiviral efficacy is less than about 30 seconds, or even less than about 15 seconds. The methods may comprise a single step of applying the composition onto the surface without direct physical removal, such as a rinse step and/or a wiping step. Beneficially, in various embodiments the compositions can optionally provide a no-rinse application. As a further benefit, in various embodiments the compositions can optionally provide a wiping application. As a still further benefit, in various embodiments the compositions can provide a no-rinse and no wiping application.

In some aspects, the solid compositions include a first step of either diluting the concentrate liquid composition (or forming an aqueous use composition from the solid) using an aqueous source, such as water, to form a use solution from the liquid concentrate or to form an aqueous use solution from the solid. The aqueous use solution can be further diluted to a desired use solution.

In some aspects, the methods can further include a pre-cleaning step, such as where a cleaning compositions is applied, wiped and/or rinsed, and thereafter followed by the applying of the compositions. The compositions and methods of use thereof can include treating cleaned or soiled surfaces. In some embodiments the amount of contact time between the composition and the surface is sufficient to reduce the population of microorganisms (including Murine Norovirus as a surrogate for norovirus) on a surface to provide greater than a 99.9% reduction (3-log order reduction) in such population, greater than 99.99% reduction (4-log order reduction) in such populations, or greater than a 99.999% reduction (5-log order reduction) in the population of microorganisms and pathogens. The contact time is preferably less than about 30 minutes, less than about 15 minute or less than about 5 minutes.

Temperature conditions for the methods can range from about 40° F.-160° F., about 60° F.-140° F., or about 70° F.-140° F.

Beneficially, the methods do not require a rinse step. In an aspect, the compositions are food contact approved and do not require a rinse step. As a further benefit, the methods do not cause corrosion and/or interfere with surfaces (e.g. hazy, dull or other negative aesthetic effects on the surface).

The methods can optionally include the use of various sensors and/or indicators. In an aspect, the level of active ingredients in use solution can be monitored by various ways. In one approach, the critical pH of the solution at which the product will start to lose its biocidal efficacy significantly is visually indicated by a color change, and the color change is achieved by choosing a dye that show dramatic color change at this pH. The dye could be simply incorporated into the product, and preferably the dye is incorporated into a polymeric substrate to form a color change strip, and the strip will put in the container, for example the $3^{rd}$ sink to show the color change when the solution pass the critical pH value. Additionally, the level of anionic surfactants in use solution could also be monitored by a similar manner, where a color change will indicate the critical concentration of anionic surfactant needed for biocidal efficacy.

In an additional embodiment, as an alternative to visual indicators, properties of the use solution including pH, anionic activity, fluorescence, and/or conductivity can be monitored by sensors that provide a visual or audible signal when the solution is no longer within a specified range. In some embodiments, a marker molecule can be added to the composition, where the change of the active ingredients in the use solution will trigger the physical and/or chemical property changes of the marker molecule, and the change is quantified through a signal processing.

In embodiments, the virucidal compositions meet bactericidal requirements for EN1276 (bacterial suspension study), EN13697 (bacteria-carrier based study), and EN16615 (bacteria-carrier based study) at 18° C.-25° C. under clean and/or dirty conditions. In embodiments, the virucidal compositions meet virucidal requirements for EN14476 at 18° C.-25° C. under clean and/or dirty conditions. As one skilled in the art will appreciate, the suspension studies can also be referred to as Phase 2, Step 1 (or 2.1-suspension) studies and the carrier studies can also be referred to as Phase 2, Step 2 (or 2.2-carrier) studies or also laboratory simulated surface tests.

All publications and patent applications in this specification are indicative of the level of ordinary skill in the art to which this invention pertains. All publications and patent applications are herein incorporated by reference to the same extent as if each individual publication or patent application were specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The following abbreviations and/or tradenames for products used in the Examples are described in further detail below in Table 3:

TABLE 3

| | | |
|---|---|---|
| LAS (96%) | Linear Alkyl Benzene Sulfonate | Anionic Surfactant |
| Dowfax C6L (45%) | Alkyldiphenyloxide Disulfonate Salt, C6 linear | Anionic Surfactant |
| Dowfax 3B2 (45%) | Alkyldiphenyloxide Disulfonate Salt, C10 linear | Anionic Surfactant |
| Dowfax 8390 (35%) | Alkyldiphenyloxide Disulfonate Salt, C16 linear | Anionic Surfactant |
| Dowfax 2A1 (45%) | Alkyldiphenyloxide Disulfonate Salt, C12 branched | Anionic Surfactant |
| SAS (Hostapur 30) | Sodium Alkane Sulfonate | Anionic Surfactant |
| AOS (Bioterge AS40) | Alpha Olefin Sulfonate | Anionic Surfactant |
| Akypo LF4 | Alkyl Ether Carboxylate, C6/C8 3+8EO | Anionic Surfactant |
| Akypo RLM25 | Alkyl Ether Carboxylate, C12/C14 4.5EO | Anionic Surfactant |
| Alphastep PC48 | Sodium Methyl 2-sulfolaurate and disodium 2-sulfolaurate | Anionic Surfactant |
| Crodasinic CS30 | Sodium Cocoyl Sarcosinate | Anionic Surfactant |
| SLES | sodium lauryl ether sulfate | Anionic Surfactant |
| SLS | Sodium lauryl sulfate | Anionic Surfactant |
| DOSS | Sodium Dioctyl Sulfosuccinate | Anionic Surfactant |
| Lactic (88%) | Lactic Acid | Acidulent |
| MSA (70%) | Methane Sulfonic Acid | Acidulent |

TABLE 3-continued

| | | |
|---|---|---|
| Pluronic 17R4 | Poly(ethylene oxide)-poly(propylene oxide)-poly(ethylene oxide) (PEO-PPO- PEO), triblock copolymers, PPO14-PEO24-PPO14] | Nonionic Surfactant |
| FD&C Red 40 | FD&C Red 40 Dye | Dye |

For the testing EN hard water was prepared according to the following methodology: Solution A was prepared by dissolving 1.98 g magnesium chloride ($MgCl_2$) and 4.62 g calcium chloride ($CaCl_2$) in lab purified water and diluting to 100 mL. The solution was sterilized by membrane filtration. Solution B was prepared by dissolving 3.50 g sodium bicarbonate ($NaHCO_3$) in lab purified water and diluting to 100 mL. The solution was sterilized by membrane filtration. Both solutions were stored in the refrigerator (2-8° C.) and used before expiration date for each solution (one month for solution A and one week for solution B). On the date of preparation, 6.0 mL of solution A and 8.0 mL of solution B were added to approximately 700 mL of sterile lab purified water in a 1000 mL volumetric flask. Sterile lab purified water was added to 1000 mL volume. The hard water was well mixed. The pH of the hard water was adjusted with 1 N hydrochloric acid to a target pH range of 7.0±0.2. The water hardness was verified by adding 10 mL of hard water to 40 mL of lab purified water. A small amount of water hardness indicator and 1 mL of water hardness buffer were added and mixed well. The solution was then titrated for ppm as $CaCO_3$ with 0.01M EDTA.

Example 1

Bactericidal Efficacy Screening. Bactericidal efficacy screening was conducted with the chemistries of Table 4 following EN1276 using both *S. aureus* ATCC 6538 at a 5 minute contact. The concentrate chemistries were prepared by adding materials as outlined in table below to a glass beaker and stirred with a stir bar until homogeneous. On the test date, 1.25% by wt dilutions were prepared of the test chemistries to evaluate a 1% by weight dilution of the product (which considers dilution that takes place within the micro efficacy method) according to the tables below with EN hard water as the diluent. pH was measured with a pH meter and recorded. Using a micro-pipette, MSA (70%) was added in 10 uL increments to test samples until a pH of 2.0-2.1 was observed and the total volume of MSA (70%) added the final pH of the use solution was recorded as shown in Tables 5-7.

The testing was conducted under clean conditions (meaning the treated panels had a soil level of 0.3 g/L bovine serum albumin) at 20° C. with a 5 minute contact time using EN hard water. The Crodasinic CS30 formulation could not be evaluated as the composition demonstrated immediate instability. The testing was carried out over three different test dates and for each test date a "no anionic control" and the "LAS control" were included.

TABLE 4

| RM | Nominal RM Active | LAS Control | No Anionic Control | Dowfax C6L | Dowfax 3B2 | Dowfax 8390 | Dowfax 2A1 | SAS |
|---|---|---|---|---|---|---|---|---|
| Water | | 32.81% | 46.15% | 17.71% | 17.71% | 9.59% | 17.71% | 3.49% |
| LAS (96%) | 96% | 13.33% | 0.00% | 0.00% | 0.00% | 0.00% | 0.00% | 0.00% |
| Dowfax C6L (45%) | 45% | 0.00% | 0.00% | 28.44% | 0.00% | 0.00% | 0.00% | 0.00% |
| Dowfax 3B2 (45%) | 45% | 0.00% | 0.00% | 0.00% | 28.44% | 0.00% | 0.00% | 0.00% |

TABLE 4-continued

| | | | | | | | | |
|---|---|---|---|---|---|---|---|---|
| Dowfax 8390 (35%) | 35% | 0.00% | 0.00% | 0.00% | 0.00% | 36.56% | 0.00% | 0.00% |
| Dowfax 2A1 (45%) | 45% | 0.00% | 0.00% | 0.00% | 0.00% | 0.00% | 28.44% | 0.00% |
| SAS (Hostapur 30) | 30% | 0.00% | 0.00% | 0.00% | 0.00% | 0.00% | 0.00% | 42.66% |
| AOS (Bioterge AS40) | 40% | 0.00% | 0.00% | 0.00% | 0.00% | 0.00% | 0.00% | 0.00% |
| Akypo LF4 | 89% | 0.00% | 0.00% | 0.00% | 0.00% | 0.00% | 0.00% | 0.00% |
| Alphastep PC48 | 38% | 0.00% | 0.00% | 0.00% | 0.00% | 0.00% | 0.00% | 0.00% |
| Crodasinic CS30 | 30% | 0.00% | 0.00% | 0.00% | 0.00% | 0.00% | 0.00% | 0.00% |
| SLES | 60% | 0.00% | 0.00% | 0.00% | 0.00% | 0.00% | 0.00% | 0.00% |
| SLS | 30% | 0.00% | 0.00% | 0.00% | 0.00% | 0.00% | 0.00% | 0.00% |
| DOSS | 98% | 0.00% | 0.00% | 0.00% | 0.00% | 0.00% | 0.00% | 0.00% |
| Lactic (88%) | 88% | 38.79% | 38.79% | 38.79% | 38.79% | 38.79% | 38.79% | 38.79% |
| MSA (70%) | 70% | 10.06% | 10.06% | 10.06% | 10.06% | 10.06% | 10.06% | 10.06% |
| Pluronic 17R4 | 100% | 5.00% | 5.00% | 5.00% | 5.00% | 5.00% | 5.00% | 5.00% |
| FD&C Red 40 | | 0.0058% | 0.00% | 0.00% | 0.00% | 0.00% | 0.00% | 0.00% |

| RM | AOS | Akypo LF4 | Alphastep PC48 | Crodasinic CS30 | SLES | SLS | DOSS |
|---|---|---|---|---|---|---|---|
| Water | 14.16% | 31.77% | 12.47% | 3.49% | 24.82% | 3.49% | 33.09% |
| LAS (96%) | 0.00% | 0.00% | 0.00% | 0.00% | 0.00% | 0.00% | 0.00% |
| Dowfax C6L (45%) | 0.00% | 0.00% | 0.00% | 0.00% | 0.00% | 0.00% | 0.00% |
| Dowfax 3B2 (45%) | 0.00% | 0.00% | 0.00% | 0.00% | 0.00% | 0.00% | 0.00% |
| Dowfax 8390 (35%) | 0.00% | 0.00% | 0.00% | 0.00% | 0.00% | 0.00% | 0.00% |
| Dowfax 2A1 (45%) | 0.00% | 0.00% | 0.00% | 0.00% | 0.00% | 0.00% | 0.00% |
| SAS (Hostapur 30) | 0.00% | 0.00% | 0.00% | 0.00% | 0.00% | 0.00% | 0.00% |
| AOS (Bioterge AS40) | 31.99% | 0.00% | 0.00% | 0.00% | 0.00% | 0.00% | 0.00% |
| Akypo LF4 | 0.00% | 14.38% | 0.00% | 0.00% | 0.00% | 0.00% | 0.00% |
| Alphastep PC48 | 0.00% | 0.00% | 33.68% | 0.00% | 0.00% | 0.00% | 0.00% |
| Crodasinic CS30 | 0.00% | 0.00% | 0.00% | 42.66% | 0.00% | 0.00% | 0.00% |
| SLES | 0.00% | 0.00% | 0.00% | 0.00% | 21.33% | 0.00% | 0.00% |
| SLS | 0.00% | 0.00% | 0.00% | 0.00% | 0.00% | 42.66% | 0.00% |
| DOSS | 0.00% | 0.00% | 0.00% | 0.00% | 0.00% | 0.00% | 13.06% |
| Lactic (88%) | 38.79% | 38.79% | 38.79% | 38.79% | 38.79% | 38.79% | 38.79% |
| MSA (70%) | 10.06% | 10.06% | 10.06% | 10.06% | 10.06% | 10.06% | 10.06% |
| Pluronic 17R4 | 5.00% | 5.00% | 5.00% | 5.00% | 5.00% | 5.00% | 5.00% |
| FD&C Red 40 | 0.00% | 0.00% | 0.00% | 0.00% | 0.00% | 0.00% | 0.00% |

TABLE 5

| Concentrate Sample | g concentrate | g EN water | pH | uL MSA (70%) | final pH |
|---|---|---|---|---|---|
| LAS Control | 1.27 | 98.76 | 2.057 | none | 2.057 |
| Dowfax 2A1 | 1.27 | 98.78 | 2.2 | 4 × 10 uL | 2.08 |
| Dowfax 8390 | 1.28 | 98.76 | 2.223 | 6 × 10 uL | 2.06 |
| Dowfax C6L | 1.26 | 98.76 | 2.211 | 5 × 10 uL | 2.061 |
| Dowfax 3B2 | 1.28 | 98.75 | 2.216 | 5 × 10 uL | 2.07 |
| No Anionic Control | 1.27 | 98.74 | 2.207 | 6 × 10 uL | 2.056 |

TABLE 6

| Concentrate Sample | g concentrate | g EN water | pH | uL MSA (70%) | final pH |
|---|---|---|---|---|---|
| LAS Control | 1.29 | 98.76 | 2.05 | n/a | 2.05 |
| No Anionic Control | 1.27 | 98.73 | n/a | 9 × 10 uL | 2.077 |
| AOS | 1.28 | 98.75 | 2.239 | 11 × 10 uL | 2.063 |
| Akypo LF4 | 1.28 | 98.76 | 2.203 | 10 × 10 uL | 2.051 |
| Alphastep PC48 | 1.35 | 98.76 | 2.212 | 9 × 10 uL | 2.061 |
| SAS | n/a | n/a | n/a | n/a | n/a |

TABLE 7

| Concentrate Sample | g concentrate | g EN water | pH | uL MSA (70%) | final pH |
|---|---|---|---|---|---|
| LAS Control | 1.25 | 98.75 | not recorded | none | not recorded |
| No Anionic Control | 1.25 | 98.75 | not recorded | added MSA (70%) in 10 uL increments while continuously monitoring pH with a pH meter until a pH of 2.0-2.1 was achieved | not recorded |
| SLES | 1.25 | 98.75 | not recorded | | not recorded |
| DOSS | 1.25 | 98.75 | not recorded | | not recorded |
| SLS | 1.25 | 98.75 | not recorded | | not recorded |

The results are shown in Table 8 and FIG. 1.

TABLE 8

| Test dates | Test Results (5 minutes at 20 C. with clean conditions) | Log Red (≥5 logs required) | Pass/Fail |
|---|---|---|---|
| Test 1 | No Anionic Control | 3.70 | Fail |
| Test 1 | DowFax 2A1 | 5.37 | Pass |
| Test 1 | DowFax 3B2 | 5.37 | Pass |
| Test 1 | DowFax 8390 | 5.37 | Pass |
| Test 1 | DowFax C6L | 5.37 | Pass |
| Test 1 | LAS control | 5.37 | Pass |
| Test 2 | No Anionic Control | 2.85 | Fail |
| Test 2 | Akypol LF4 | 4.23 | Fail |
| Test 2 | Alphastep PC48 | 5.22 | Pass |
| Test 2 | AOS | 5.22 | Pass |
| Test 2 | SAS | 5.22 | Pass |
| Test 2 | LAS control | 5.22 | Pass |
| Test 3 | No Anionic Control | 3.06 | Fail |
| Test 3 | SLES | 5.43 | Pass |
| Test 3 | DOSS | 5.43 | Pass |
| Test 3 | SLS | 5.43 | Pass |
| Test 3 | LAS control | 5.43 | Pass |

The screening of the various anionic chemistries demonstrates that all anionic chemistries (excluding Akypo LF4 and the negative control) provide a ≥5 log reduction against *S. aureus*.

Example 2

Antiviral efficacy testing. Antiviral efficacy testing was conducted with the chemistries of Table 9 (with some modifications to the formulations tested for antimicrobial efficacy) EN14476 using adenovirus and murine norovirus (MNV) at a 5 and 15 minute contact time. MNV is a species of norovirus that is used as a model for human norovirus. The concentrate chemistries were prepared by adding materials as outlined in table below to a glass beaker and stirred with a stir bar until homogeneous. On the test date, 1.25% by wt dilutions were prepared of the test chemistries to evaluate a 1% by weight dilution of the product (which considers dilution that takes place within the micro efficacy method) according to the tables below with EN hard water as the diluent. The pH was not measured for the antiviral testing as the results would be consistent with those of Example 1.

In each test, there was one replicate per test condition. The lab carried these out at room temperature under clean conditions using EN hard water. The compositions were diluted at 1% by weight with a fixed active anionic concentration in the use solution of 1300 ppm.

TABLE 9

| RM | RM Active | No Anionic Control | Dowfax C6L | Dowfax 3B2 | Dowfax 8390 | AOS | SLES | DOSS |
|---|---|---|---|---|---|---|---|---|
| Water | | 46.15% | 17.71% | 17.71% | 9.59% | 14.16% | 34.88% | 37.93% |
| Dowfax C6L (45%) | 45% | 0.00% | 28.44% | 0.00% | 0.00% | 0.00% | 0.00% | 0.00% |
| Dowfax 3B2 (45%) | 45% | 0.00% | 0.00% | 28.44% | 0.00% | 0.00% | 0.00% | 0.00% |
| Dowfax 8390 (35%) | 35% | 0.00% | 0.00% | 0.00% | 36.56% | 0.00% | 0.00% | 0.00% |
| AOS (Bioterge AS40) | 40% | 0.00% | 0.00% | 0.00% | 0.00% | 31.99% | 0.00% | 0.00% |
| SLES | 60% | 0.00% | 0.00% | 0.00% | 0.00% | 0.00% | 21.33% | 0.00% |
| DOSS | 70% | 0.00% | 0.00% | 0.00% | 0.00% | 0.00% | 0.00% | 18.28% |
| Lactic (88%) | 88% | 38.79% | 38.79% | 38.79% | 38.79% | 38.79% | 38.79% | 38.79% |
| MSA (70%) | 70% | 10.06% | 10.06% | 10.06% | 10.06% | 10.06% | 0.00% | 0.00% |
| Pluronic 17R4 | 100% | 5.00% | 5.00% | 5.00% | 5.00% | 5.00% | 5.00% | 5.00% |

The cytotoxicity (log 10 CD50/mL), titer of virus control (log 10 TCID 50/mL), virus titer after time periods and the log reductions are shown in the results (see Figures). The results are shown in FIG. 2 (adenovirus) and FIG. 3 (MNV). The figures show the efficacy of the compositions evaluated with the 15 minute contact time. The adenovirus results (FIG. 2) show that all anionic formulations provide ≥4 log kill at 15 minutes and "n.d." (nondetectable) measures of virus at 30 and 60 minutes. However, the testing for the MNV (FIG. 3) shows the unexpected result that only the AOS anionic formulation provides efficacy ≥4 log kill at 15 minutes (and earlier at 5 minutes).

This is a surprising result that was rerun to verify accuracy of the testing. Additional testing was conducted over longer contact times including 30 minutes and 60 minute contact times to determine if the anionic surfactants would provide the virucidal efficacy against MNV with longer contact times. The AOS-containing virucidal compositions again outperformed other anionic surfactants confirming the unexpected results that the AOS-containing virucidal compositions outperformed other anionic surfactants with the acids in providing virucidal efficacy.

Example 3

Additional antiviral efficacy testing. Following the unexpected results of Example 2 wherein AOS anionic formulation outperformed other anionics for MNV, additional testing was conducted to assess impact on % dilution and contact time. The methods of Example 2 were followed with modifications to the formulations as shown in Table 10. The compositions were diluted at 1% by weight with a fixed active anionic concentration in the used solution of 1300 ppm.

weight dilution (providing 1300 ppm anionic concentration in the use solution) confirming the results of Example 2. In addition, the AOS anionic compositions further provide antiviral efficacy at 0.75% by weight dilution at 15 minutes, at still further at a 0.5% by weight dilution at 30 minutes.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:
1. A virucidal composition comprising:
   from about 30 wt-% to about 50 wt-% of a weak acid comprising lactic acid;
   from about 5 wt-% to about 30 wt-% of a strong acid comprising methane sulfonic acid;
   a $C_8$-$C_{22}$ alpha olefin sulfonate anionic surfactant;
   wherein the composition is a liquid or a solid;
   an alkoxylated nonionic surfactant having an EO/PO block copolymer; and
   wherein a use pH of the composition is from about 1.5 to about 4.
2. The composition of claim 1, wherein the alpha olefin sulfonate anionic surfactant comprises from about 0.1 wt-% to about 50 wt-%.
3. The composition of claim 1, wherein the alpha olefin sulfonate anionic surfactant comprises from about 0.1 wt-%

TABLE 10

| % by wt Dilution Rate | | 1% | 1% No | 0.5%, | | 1% | 1% | 1% | 1% | 8% |
|---|---|---|---|---|---|---|---|---|---|---|
| RM | RM Active | LAS Control | Anionic Control | 0.75%, 1% AOS | 1% SAS | Dowfax 8390 | SLES lactic | SLS lactic | DOSS lactic | SOA lactic |
| Water | | 32.81% | 46.15% | 14.16% | 3.49% | 9.59% | 34.88% | 13.55% | 43.15% | 92.2% |
| LAS (96%) | 96% | 13.33% | 0.00% | 0.00% | 0.00% | 0.00% | 0.00% | 0.00% | 0.00% | 0.00% |
| AOS (Bioterge AS40) | 40% | 0.00% | 0.00% | 31.99% | 0.00% | 0.00% | 0.00% | 0.00% | 0.00% | 0.00% |
| SOA | 70% | 0.00% | 0.00% | 0.00% | 0.00% | 0.00% | 0.00% | 0.00% | 0.00% | 2.3% |
| Dowfax 8390 (35%) | 35% | 0.00% | 0.00% | 0.00% | 0.00% | 36.56% | 0.00% | 0.00% | 0.00% | 0.00% |
| SAS (Hostapur 30) | 30% | 0.00% | 0.00% | 0.00% | 42.66% | 0.00% | 0.00% | 0.00% | 0.00% | 0.00% |
| SLES | 60% | 0.00% | 0.00% | 0.00% | 0.00% | 0.00% | 21.33% | 0.00% | 0.00% | 0.00% |
| SLS | 30% | 0.00% | 0.00% | 0.00% | 0.00% | 0.00% | 0.00% | 42.66% | 0.00% | 0.00% |
| DOSS | 98% | 0.00% | 0.00% | 0.00% | 0.00% | 0.00% | 0.00% | 0.00% | 13.06% | 0.00% |
| Lactic (88%) | 88% | 38.79% | 38.79% | 38.79% | 38.79% | 38.79% | 38.79% | 38.79% | 38.79% | 4.85% |
| MSA (70%) | 70% | 10.06% | 10.06% | 10.06% | 10.06% | 10.06% | 0.00% | 0.00% | 0.00% | 0.00% |
| Pluronic 17R4 | 100% | 5.00% | 5.00% | 5.00% | 5.00% | 5.00% | 5.00% | 5.00% | 5.00% | 0.63% |
| FD&C Red 40 | | 0.0058% | 0.00% | 0.00% | 0.00% | 0.00% | 0.00% | 0.00% | 0.00% | 0.00% |
| Use solution pH | | ~2.4 | ~2.4 | ~2.4 | ~2.4 | ~2.4 | ~2.8 | ~2.8 | ~2.8 | ~2.8 |

The results are shown in FIG. 4. The figures show the efficacy of the AOS anionic compositions again at 1% by to about 50 wt-%, and the composition further comprises from about 1 wt-% to about 20 wt-% of at least one additional functional ingredient and/or from about 1 wt-% to about 20 wt-% of an additional nonionic surfactant.

4. The composition of claim 1, wherein the alpha olefin sulfonate anionic surfactant comprises from about 0.1 wt-% to about 50 wt-%, and wherein the nonionic surfactant comprises from about 1 wt-% to about 20 wt-%.

5. The composition of claim 1, wherein the weak acid is present in an amount of from about 30 wt-% to about 45 wt-% and the strong acid is present in an amount of from about 5 wt-% to about 25 wt-%.

6. The composition of claim 1, wherein the composition is a liquid or a solid concentrate.

7. The composition of claim 1, further comprising an additional anionic surfactant.

8. The composition of claim 7, wherein the additional anionic surfactant is a sulfonate.

9. A method of using a virucidal composition, comprising:
  contacting the virucidal composition of claim 1 to a surface in need of treatment, and
  inactivating a viral population, wherein the antiviral inactivation is at least a 3 log reduction to complete inactivation within less than about 60 minutes, 30 minutes, 10 minutes, 5 minutes, 1 minute, 30 seconds, or 15 seconds.

10. The method of claim 9, wherein the virucidal composition is diluted to a use solution before the contacting step, and wherein the diluted use solution is made from about a 0.5% to about a 3% by weight dilution.

11. The method of claim 9, wherein the contacting is by wiping, dipping, immersing, or spraying.

12. The method of claim 9, wherein the surface is a hard surface that is a precleaned hard surface, a surface contaminated with norovirus and/or other viral populations, and/or a human or mammalian tissue.

13. The method of claim 9, wherein the contacting provides complete kill of the virus in less than 1 minute, and wherein the contacting step is at an aqueous use temperature from about 40° F.-160° F.

14. The method of claim 9, wherein the concentrate is diluted at a rate of from about 1/8 oz./gal. to about 12 oz./gal. to form a use solution of the virucidal composition.

15. The method of claim 9, wherein a sensor and/or indicator is employed to measure and detect at least one of the following: solution pH at which the composition loses biocidal efficacy, concentration of anionic surfactant in the use solution, fluorescence, and/or conductivity.

16. The method of claim 9, wherein the virus is human norovirus, Adenovirus and/or Poliovirus.

17. The method of claim 9, wherein the inactivating of the viral population provides the at least a 3 log reduction to complete inactivation within about 10 minutes, 5 minutes, 1 minute, 30 seconds, or 15 seconds, and wherein the virucidal composition meets the requirements of EN1276, EN13697, EN16615, and/or EN14476 at 18° C.-25° C. under clean and/or dirty conditions.

18. The method of claim 9, wherein the method does not require a rinse step.

\* \* \* \* \*